US007337219B1

(12) United States Patent
Meenan et al.

(10) Patent No.: US 7,337,219 B1
(45) Date of Patent: Feb. 26, 2008

(54) CLASSIFYING DEVICES USING A LOCAL PROXY SERVER

(75) Inventors: Patrick Meenan, Gainesville, VA (US); Jeffrey Joseph Damick, Manassas, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 815 days.

(21) Appl. No.: 10/447,958

(22) Filed: May 30, 2003

(51) Int. Cl.
*G06F 15/16* (2006.01)
(52) U.S. Cl. ...................... 709/220; 709/245
(58) Field of Classification Search ............... 709/238, 709/245, 200–203, 217–227
See application file for complete search history.

(56) References Cited

U.S. PATENT DOCUMENTS

| 5,577,197 A | 11/1996 | Beck |
| 5,606,668 A | 2/1997 | Shwed |
| 5,706,507 A | 1/1998 | Schloss |
| 5,793,763 A | 8/1998 | Mayes et al. |
| 5,826,000 A | 10/1998 | Hamilton |
| 5,852,722 A | 12/1998 | Hamilton |
| 5,877,724 A | 3/1999 | Davis |
| 5,907,831 A | 5/1999 | Lotvin et al. |
| 5,918,019 A | 6/1999 | Valencia |
| 5,973,684 A | 10/1999 | Brooks et al. |
| 5,987,611 A | 11/1999 | Freund |
| 6,006,272 A | 12/1999 | Aravamudan et al. |
| 6,052,750 A | 4/2000 | Lea |
| 6,055,236 A | 4/2000 | Nessett et al. |
| 6,085,236 A | 7/2000 | Lea |

(Continued)

FOREIGN PATENT DOCUMENTS

CA 2312460 2/2001

(Continued)

OTHER PUBLICATIONS

Alexander, S. and Droms, R., "DHCP Options and BOOTP Vendor Extensions (Request for Comments: 2132)", The Internet Engineering Task Force, Mar. 1997, pp. 1-32.

(Continued)

*Primary Examiner*—Moustafa Meky
(74) *Attorney, Agent, or Firm*—Fish & Richardson P.C.

(57) ABSTRACT

A local proxy in a home network may identify the device class to which a particular device in the home network belongs based on the receipt of a message requesting a network address for use by the device. A device class may include a broad category to describe the device (such as, a gaming device, a personal computer, an appliance, or a PDA), the type of platform (e.g., the type of hardware, such as a Macintosh™ personal computer, a Windows™-based personal computer, a Linux™-based personal computer, a PDA, a home appliance, or an entertainment device), and/or the operating environment (e.g., operating system type and/or version). The local proxy associates the device class with the device. The local proxy may process a request from a device in a home network based on the device class of the device that sent the request. For example, access to a game available on the home network may be restricted to a gaming device or personal computer. Access to financial information stored on the home network may be restricted by a computing device capable of processing financial information, such as a personal digital assistant or personal computer.

21 Claims, 12 Drawing Sheets

U.S. PATENT DOCUMENTS

| | | | |
|---|---|---|---|
| 6,101,543 A | 8/2000 | Alden et al. |
| 6,119,165 A | 9/2000 | Li et al. |
| 6,167,120 A | 12/2000 | Kikinis |
| 6,198,479 B1 | 3/2001 | Humpleman et al. |
| 6,219,706 B1 | 4/2001 | Fan et al. |
| 6,314,447 B1 | 11/2001 | Lea et al. |
| 6,314,459 B1 | 11/2001 | Freeman |
| 6,337,899 B1 | 1/2002 | Alcendor et al. |
| 6,349,352 B1 | 2/2002 | Lea |
| 6,381,222 B1 | 4/2002 | Kikinis |
| 6,421,325 B1 | 7/2002 | Kikinis |
| 6,434,596 B1 | 8/2002 | Ludtke et al. |
| 6,446,128 B1 | 9/2002 | Woods et al. |
| 6,487,605 B1 | 11/2002 | Leung |
| 6,493,875 B1 | 12/2002 | Eames et al. |
| 6,496,867 B1 | 12/2002 | Beser et al. |
| 6,523,068 B1 | 2/2003 | Beser et al. |
| 6,526,581 B1 * | 2/2003 | Edson ................. 725/74 |
| 6,535,517 B1 | 3/2003 | Arkko et al. |
| 6,546,419 B1 | 4/2003 | Humpleman et al. |
| 6,557,037 B1 | 4/2003 | Provino |
| 6,603,762 B1 | 8/2003 | Kikinis |
| 6,606,659 B1 | 8/2003 | Hegli et al. |
| 6,615,357 B1 | 9/2003 | Boden et al. |
| 6,631,416 B2 | 10/2003 | Bendinelli et al. |
| 6,640,251 B1 | 10/2003 | Wiget et al. |
| 6,643,684 B1 | 11/2003 | Malkin et al. |
| 6,654,373 B1 | 11/2003 | Lie et al. |
| 6,654,792 B1 | 11/2003 | Verma et al. |
| 6,658,415 B1 | 12/2003 | Brown et al. |
| 6,671,739 B1 | 12/2003 | Reed |
| 6,693,878 B1 | 2/2004 | Daruwalla et al. |
| 6,694,349 B1 | 2/2004 | Zou |
| 6,697,864 B1 | 2/2004 | Demirtjis et al. |
| 6,704,031 B1 | 3/2004 | Kimball et al. |
| 6,708,219 B1 | 3/2004 | Borella et al. |
| 6,738,382 B1 | 5/2004 | West et al. |
| 6,738,814 B1 | 5/2004 | Cox et al. |
| 6,745,367 B1 | 6/2004 | Bates et al. |
| 6,754,321 B1 * | 6/2004 | Innes et al. ............ 379/201.03 |
| 6,757,836 B1 | 6/2004 | Kumar et al. |
| 6,802,068 B1 | 10/2004 | Guruprasad |
| 6,832,322 B1 | 12/2004 | Boden et al. |
| 7,051,116 B1 | 5/2006 | Rodriguez-Val et al. |
| 7,079,499 B1 | 7/2006 | Akhtar et al. |
| 7,124,938 B1 | 10/2006 | Marsh |
| 2001/0000707 A1 | 5/2001 | Kikinis |
| 2001/0036192 A1 | 11/2001 | Chiles et al. |
| 2002/0049806 A1 | 4/2002 | Gatz et al. |
| 2002/0116471 A1 | 8/2002 | Shteyn |
| 2002/0169961 A1 | 11/2002 | Giles et al. |
| 2002/0191572 A1 | 12/2002 | Weinstein et al. |
| 2003/0005455 A1 | 1/2003 | Bowers |
| 2003/0009495 A1 | 1/2003 | Adjaoute |
| 2003/0014631 A1 | 1/2003 | Sprague |
| 2003/0041240 A1 | 2/2003 | Roskind et al. |
| 2003/0045308 A1 | 3/2003 | Sidhu et al. |
| 2003/0115345 A1 | 6/2003 | Chien et al. |
| 2005/0175020 A1 | 8/2005 | Park et al. |

FOREIGN PATENT DOCUMENTS

| | | |
|---|---|---|
| EP | 0889668 | 1/1999 |
| JP | 11-275083 | 10/1999 |
| JP | 2001-237898 | 8/2001 |
| WO | WO 99/19988 | 4/1999 |
| WO | WO 99/52244 | 10/1999 |
| WO | WO 00/72532 | 11/2000 |
| WO | WO 01/22661 A2 | 3/2001 |
| WO | WO 01/60897 | 8/2001 |
| WO | WO 01/61897 | 8/2001 |

OTHER PUBLICATIONS

Advisory Action, U.S. Appl. No. 10/208,181, dated Jul. 21, 2006, 3 pages.

Office Action, U.S. Appl. No. 10/208,181, dated Sep. 23, 2005, 21 pages.

Office Action, U.S. Appl. No. 10/208,181, dated Apr. 18, 2006, 30 pages.

Office Action, U.S. Appl. No. 10/208,181, dated Nov. 22, 2006, 26 pages.

Office Action, U.S. Appl. No. 10/208,181, dated May 25, 2007, 28 pages.

Agranat, Ian, "Authentication Standardizes Web," *Electronic Engineering Times*, No. 1018, p. 78, Jul. 27, 1998.

Business Wire, Feb. 10, 1998, Ramp Network Ships IP Tunneling Kit for WebRamp M3 Family, pp. 1-4.

Dennis Fowler, VPNs Become a Virtual Reality, NetNews, Apr./May 1998, pp. 1-4.

"Embedded Web Guru Co-Authors New Security Standard; Digest Authentication Provides Secure Web Login," Business Wire, Jun. 14, 1999, pp. 1-2.

Eric A. Hall, "Hide & Seek with Gateways & Translators," http://www.ehsco.com/reading/19970215ncw1.html, Feb. 15, 1997, pp. 1-5.

Evans, Shara: "Tunnelling through the web" Standards Watch, 'Online'; Mar. 1999; http://www.telsyte.com.au/standardswatch/tunnels.htm, pp. 1-6.

G. Montenegro et al., "RSIP Support for End-to-end IPsec," pp. 1-18 (Jul. 2000), available at http://www.ietf.org/internet-drafts/draft-ietf-nat-rsip-ipsec-04.txt.

G. Tsirtsis et al., "Network Address Translation - Protocol Translation (NAT-PT)," http://www.ietf.org/rfc/rfc2766.txt?number=2766, Feb. 2000, pp. 1-19.

"Intel Introduces High Speed Wireless Networking Products Designed for the Home and Small Office," M2 Communications Ltd., 2002, pp. 1-3.

K. Egevang et al., "The IP Network Address Translator (NAT)," http://www.cis.ohio-state.edu/cgi-bin/rfc/rfc1631.html, May 1994, pp. 1-9.

L. Mamakos et al., "A Method for Transmitting PPP Over Ethernet (PPPoE)," pp. 1-15 (Feb. 1999), available at ftp://ftp.isi.edu/in-notes/rfc2516.txt.

M. Borella et al., "Realm Specific IP: Framework," pp. 1-30 (Jul. 2000), available at ftp://ftp.isi.edu/internet-drafts/draft-ietf-nat-rsip-framework-05.txt.

M. Holdrege et al., "Protocol Complications with the IP Network Address Translator," http://www.ietf.org/rfc/rfc3027.txt?number=3027, Jan. 2001, pp. 1-18.

"Network Address Translation Technical Discussion," http://safety.net/nattech.html, Apr. 18, 1996, pp. 1-4.

Network Telesystems, NTS Tunnel Builder for Mac User's Guide, Mar. 1999, 50 pages.

Newswire Association Inc., Ramp Networks Announces Comprehensive Virtual Private Network Solution; Targets Corporate Branch Offices; Aug. 9, 1999, 2 pages.

Pamela Brill, Fast & Furious, Mar. 22, 1999, Network Computing, pp. 1-3.

Patel et al., "DHCP Configuration of IPSEC Tunnel Mode", IPSEC Working Group, Dec. 1999, 12 pages.

"PPP over Ethernet: A Comparison of Alternatives for PC-to-xDSL Modem Connectivity," Redback Networks, Mar. 1999, pp. 1-8.

Prosise, Jeff, "ASP.NET Security: An Introductory Guide to Building and Deploying More Secure Sites with ASP.NET and IIS," *MSDN Magazine*, vol. 17, No. 4, p. 54, Apr. 30, 2002, 14 pages.

P. Srisuresh et al., "IP Network Address Translator (NAT) Terminology and Considerations," http://www.ietf.org/rfc/rfc2663.txt?number=2663, Aug. 1999, pp. 1-24.

P. Srisuresh et al., "Traditional IP Network Address Translator (Traditional NAT)," http://www.ietf.org/rfc/rfc3022.txt?number=3022, Jan. 2001, pp. 1-15.

R. Droms, Networking Group, Request for Comments: RFC 1541, "Dynamic Host Configuration Protocol", Oct. 1993, 30 pages.

Red Creek, "Ravlin 7100, High Performance Virtual Private Network Device for the Enterprise Gateway and ISP," reprinted from http://web.archive.org/web/20000303093640/www.redcreek.com/products/7100.html, (Mar. 3, 2000), 6 pages.

SonicWall Inc., "Configuring DHCP over VPN" Nov. 12, 2002, 11 pages.

W. Townsley et al.: "Layer 2 Tunneling Protocol L2TP" IETF, 'Online'; http://www.ietf.org/rfc/rfc2661.txt; Aug. 1999, pp. 1-80.

* cited by examiner

CLASSIFYING DEVICES USING A LOCAL PROXY SERVER

TECHNICAL FIELD

This description relates to communications in a home network.

BACKGROUND

In a network of computing devices, each of several networked devices may have particular components or capabilities for performing one or more functions. As a consequence, the network of computing devices may include a variety of devices having a wide variety of components and/or capabilities.

A device in a home network may be identified to a home gateway or another device in the home network. The identification of the device may permit the home gateway or the other device to make specific features or information available or unavailable to the device.

SUMMARY

In one general aspect, when a user device in a home network is classified, a message from a device in the home network is received at a proxy in the home network. The message is a request for a network address for use by the device from which the message was sent. A device class for the device is determined based on the received message, and the device class is associated with the device.

Implementations may include one or more of the following features. For example, the association of the device class and the device may be stored. Address information may be stored at the proxy. The address information may associate the device class and a network address for the device.

Device control information may be applied, based on the device class, to communications using the proxy. The proxy may be used to append device control information to communications sent through the proxy to another device in the home network. Access to a service or information may be enabled or denied based on the device class associated with the device.

The proxy may be a home gateway device or a router. The proxy may be located on the device or located between the device and a destination system.

A device class may include a type of operating environment, a type of software platform, or a type of device. A type of device may include a client device or a non-client device. Implementations of the techniques discussed above may include a method or process, an apparatus or system, or computer software on a computer-accessible medium.

The details of one or more implementations set forth in the accompanying drawings and the description below. Other features will be apparent from the description and drawings, and from the claims.

For brevity, several elements in the figures are represented as monolithic entities. However, as would be understood by one skilled in the art, these elements each may include numerous interconnected computers and components designed to perform a set of specified operations and/or dedicated to a particular geographical region.

DETAILED DESCRIPTION

A local proxy in a home network may identify the device class to which a particular device in the home network belongs based on the receipt of a message requesting a network address for use by the device. A device class may include a broad category to describe the device (such as, a gaming device, a personal computer, an appliance, or a PDA), the type of platform (e.g., the type of hardware, such as a Macintosh™ personal computer, a Windows™-based personal computer, a Linux™-based personal computer, a PDA, a home appliance, or an entertainment device), and/or the operating environment (e.g., the operating system type and/or version). The local proxy associates the device class with the device. The local proxy may process a request from a device in a home network based on the device class of the device that sent the request. For example, access to a game available on the home network may be restricted to a gaming device or a personal computer. Access to financial information stored on the home network may be restricted to a computing device capable of processing financial information, such as a personal digital assistant or a personal computer.

Figure 1:
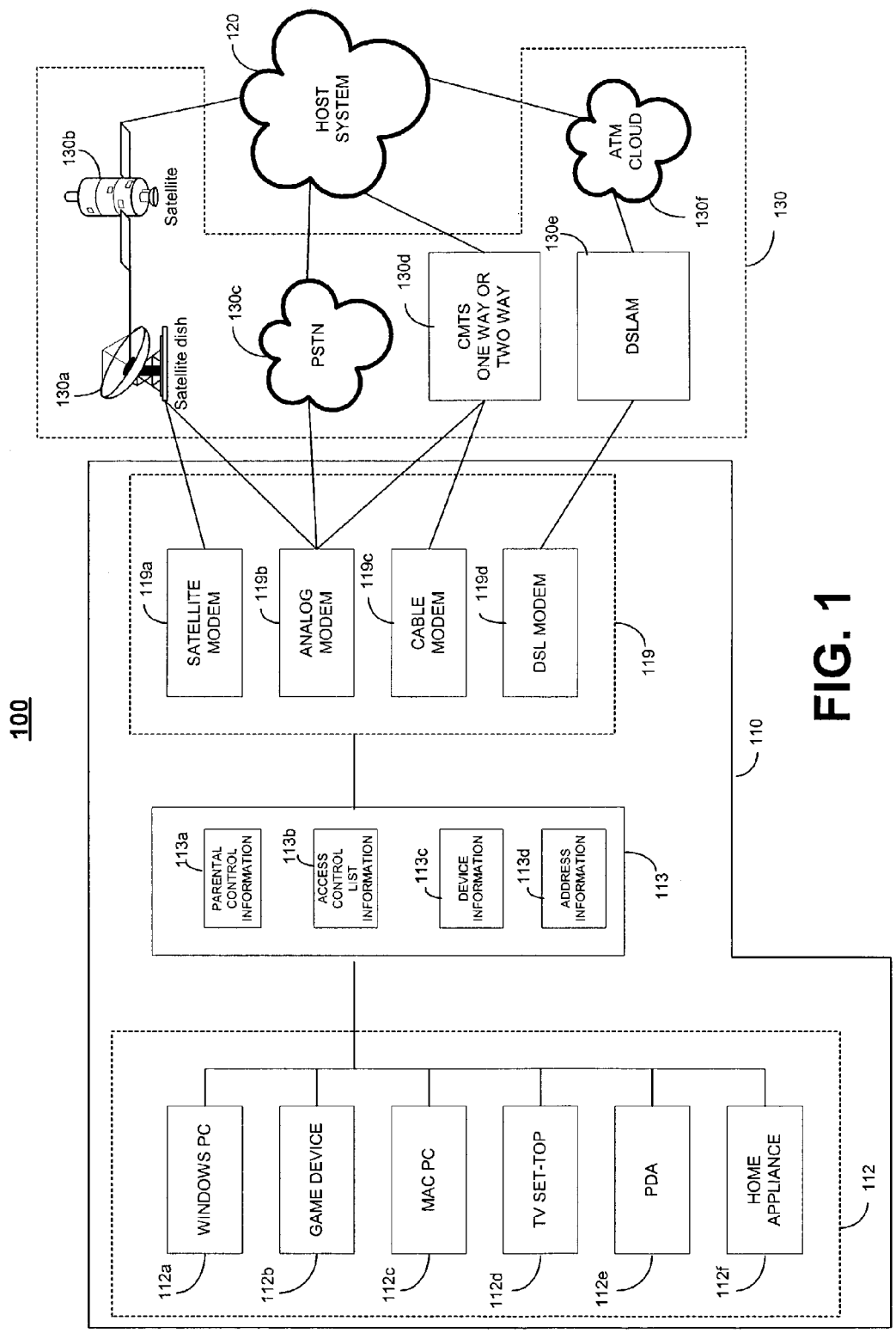
FIGS. 1 and 3 are block diagrams illustrating communications systems capable of establishing access control for a device used in a home network.

Referring to FIG. 1, a home networking system 100 includes multiple home-networked devices 112 ("devices") connected to each other and to a local proxy 113. The local proxy 113 typically connects to a host system 120 through a communication device 119 over communication links 130.

The home networking system 100 enables the devices 112 to communicate with the host system 120 through the local proxy 113 using the single communication device 119. The devices 112, the local proxy 113, and the communication device 119 may constitute a client system 110 physically located in a personal residence.

The home networking system 100 also enables the devices 112 to access information maintained by the host system 120 for a particular client device 112 or a particular individual using one of the devices 112. In addition, the home networking system 100 may enable the host system 120 to maintain and enforce individual preferences or restrictions associated with a particular client device 112 or a user of the particular client device 112. This may be accomplished through use of unique identifiers, which may be assigned by the host, the client, or another entity. Unique identifiers may be used alone or in combination with other identifiers. Identifiers may include, for example, a login name, an account number, a screen name, and a password.

Recognition of the particular devices 112 or the users of the devices permits the host system 120 to enforce or enable preferences and features, such as access controls (e.g., parental controls) or features available to a specific communication platform or environment. Similarly, the host system's recognition of or distinction among devices and users permits the individual client devices and users to access and receive back from the host certain host-maintained preferences, such as personal identification settings, personal web pages, account information, wallet information, and/or financial information.

When the client system 110 and the host system 120 communicate, the client system 110 may provide identifying information that is used by the host system 120 to determine whether to present (or restrict) information or features. However, in some contexts, the identifying information provided by the client system may not enable the host system to identify a particular client device that is communicating with the host system or the particular person using the communicating client device. This is particularly true in a home-networking environment in which several devices within the home network may communicate through a single access point (e.g., a network access translator (NAT) or other routing device) that purposefully disguises the device identities and in which more than one person may communicate using any one of the several devices.

The local proxy 113 that is located between the client devices 112 and the host system 120 may be used to identify, or provide information about, a client device or a user of a client device that accesses the host system. The local proxy may append information to communications sent by the client device. For instance, the local proxy may append information that identifies or relates to the parental control classification of the user of the client device, the type of the client device, the platform of the client device, the protocol of a system being accessed by the client device, or the operating environment of the client device. The host system may provide, or restrict, access to information or features based on the information appended to communications sent by the client device.

The local proxy generally is local to the client or client network and physically located in a personal residence. Typically, the local proxy is positioned between the client device and a host system external to the client system, such as a home gateway routing device or a device or software module at a communication interface between a home client device and a networked device through which network access is obtained for the client device. The host system may be, for example, an Internet access provider device, a host system proxy server, or another external system device.

The local proxy may store an additional copy of (or mirror) parental control information associated with one or more users or client devices. The local proxy may be used to restrict communications based on the parental control classification of a user or a device and/or may be used to verify that parental control information has not been improperly modified or accessed.

The devices 112 and the local proxy 113 typically are located in a physical place that enables the local proxy 113 to network with the devices 112. In one implementation, for example, the local proxy 113 is physically located in a personal residence (e.g., a single-family dwelling, a house, a townhouse, an apartment, or a condominium). The devices 112 may be physically located such that communications with the local proxy 113 are enabled and maintained. For instance, when the local proxy 113 is physically located in a personal residence, the devices 112 also may be physically located in the personal residence. The location of the local proxy 113 in the personal residence does not necessarily preclude one or more of the devices 112 from being networked to the local proxy 113 from a remote location. Similarly, the location of the local proxy does not necessarily preclude use of one or more of the devices 112 from outside of the personal residence or communication by those devices with the host system 120 through the local proxy 113. For instance, the devices 112 may include one or more portable computing devices that may be taken outside of the personal residence and still remain connected to the local proxy 113 located within the personal residence through a wireless network 110.

The devices 112 may include one or more general-purpose computers (e.g., personal computers), one or more special-purpose computers (e.g., devices specifically programmed to communicate with the local proxy 113 and/or the host system 120), or a combination of one or more general-purpose computers and one or more special-purpose computers. Other examples of devices 112 include a workstation, a server, an appliance (e.g., a refrigerator, a microwave, or an oven), an intelligent household device (e.g., a thermostat, a security system, a heating, a ventilation and air conditioning (HVAC) system, or a stereo system), a device, a component, other physical or virtual equipment, or some combination of these elements capable of responding to and executing instructions within the system architecture.

FIG. 1 shows several implementations and possible combinations of devices and systems used within the home networking system 100. Examples of devices 112 may include, but are not limited to, a personal computer with a Windows™ OS 112a, a game device 112b, a Macintosh™ personal computer 112c, a TV set-top box 112d, a PDA 112e, and a home appliance 112f. The devices 112 are connected through a network to the local proxy 113.

Some of the devices 112, such as the personal computer with Windows™ OS 112a, the Macintosh™ personal computer 112c, and the PDA 112e, include software for logging on to the host system 120 using a particular identity associated with the user of the device. Such devices may be referred to as client devices. Other devices, such as the home appliance 112f, may include software for logging on to host system 120 without identifying an associated identity of the user of the device and may be referred to as non-client devices. Yet other devices, such as the game device 112b and the TV set-top 112d, may be able to function either as a client device or a non-client device depending on the function being performed.

The local proxy 113 may be a protocol server module, such as the protocol server module 313 discussed below with respect to FIG. 3; a home gateway device, a router, or another communications device; and/or a home entertainment device, such as a stereo system, a radio tuner, a TV tuner, a portable music player, a personal video recorder, or a gaming device. The local proxy 113 may be referred to as a client-side proxy. The local proxy 113 is separated from the host system 120 by communications links 130. In some implementations, host system 120 may be an online access provider, such as an Internet access provider. The online access provider is separated from the local proxy 113 by communications links 130.

The local proxy 113 typically connects to the host system 120 using a communication device 119. Examples of the communication device 119 may include (but are not limited to) a satellite modem 119a, an analog modem 119b, a cable modem 119c, and a DSL modem 119d. The local proxy 113 uses the communication device 119 to communicate through communication links 130 with the host system 120. The communication links 130 may include various types of communication delivery systems that correspond to the type of communication device 119 being used. For example, if the local proxy 113 includes a satellite modem 119a, then the communications from the devices 112 and the local proxy 113 may be delivered to the host system 120 using a satellite dish 130a and a satellite 130b. The analog modem 119b may use one of several communications links 130, such as the satellite dish 130a and satellite 130b, the Public Switched Telephone Network (PSTN) 130c (which also may be referred to as the Plain Old Telephone Service or POTS), and the Cable Modem Termination System (CMTS) 130d. The cable modem 119c typically uses the CMTS 130d to deliver and receive communications from the host system 120. The DSL modem 119d typically delivers and receives communications with the host system 120 through a Digital Subscriber Line Access Multiplexer (DSLAM) 130e and an Asynchronous Transfer Mode (ATM) network 130f.

The home networking system 100 may use various protocols to communicate between the devices 112 and the local proxy 113, and between the local proxy 113 and the host system 120. For example, a first protocol may be used to communicate between the devices 112 and the local proxy 113, and a second protocol may be used to communicate between the local proxy 113 and the host system 120. In one implementation, the first protocol and the second protocol may be the same. In another implementation, the first protocol and the second protocol may be different. The local proxy 113 may include different hardware and/or software modules to implement different home networking system protocols.

The local proxy 113 may append parental control information to communications prior to sending the communications to the host system 120. For example, the local proxy 113 may access parental control information 113a that is associated with the identity using the device 112 that is sending the communication, insert the accessed parental control information in the communication, and sent the communication including the parental control information to the host system 120.

Additionally or alternatively, the local proxy 113 may function to filter communications before the communications are sent the host system 120. For instance, the local proxy 113 may apply parental controls to communications sent using one of the devices 112 based on the identity and/or the device that is sending the communication. This may be accomplished by accessing parental control information 113a that is associated with the identity and/or the device that is sending the communication. Access control list information 113b is used to identify destinations that may not be accessed based on the parental control information 113a (e.g., a particular parental control level) associated with the identity and/or the device sending the communication. The communication is sent to the host system 120 only when the access control list information permits the destination to be accessed by the identity and/or device sending the communication.

The local proxy 113 may append device information to communications prior to sending the communications to the host system 120. For example, the local proxy 113 may access device information 113c that is associated with the device that is sending the communication, insert the accessed device information in the communication, and send the communication including the accessed device information to the host system 120.

Device information 113c may be stored in a configuration table or list on the local proxy 113, and may be associated with a device identifier for a device, such as one of devices 112a-112f. The device identifier may include a hardware device identifier, such as a MAC ("Media Access Control") address.

The device information 113c associated with each device may include, for example, the type of device (e.g., a client or a non-client device), the class of device (e.g., a gaming device, a personal computer, or a PDA), the type of platform (e.g., the type of hardware, such as a Macintosh™ personal computer, a Windows™-based personal computer, a Linux™-based personal computer, a PDA, a home appliance, or an entertainment device), and/or the operating environment (e.g., the operating system type and/or version).

The local proxy 113 may include address information 113d that identifies the network address, such as a static IP address associated with the device or a dynamic IP address, used by a device. The dynamic IP address may be assigned by local proxy 113, by some other network device, or by the host system 120 through the Dynamic Host Configuration Protocol (DHCP) or another protocol that enables the dynamic allocation of an IP address to a device on a network. The address information 113d also may include network addresses that are available to be assigned to devices but have not yet been assigned to a particular device.

For example, the address information 113d may include the list of addresses, such as IP addresses, that are assigned, or available to be assigned, by the local proxy 113 to devices on the home network. For each assigned address, the address information 113d may identify the device to which the address has been assigned, for example, by associating the device identifier with an assigned address. When an IP address is assigned, the MAC address of the device to which the IP address is assigned is used as the device identifier. The address information 113d also may include the class of device and/or the type of device associated with the device to which the address has been assigned. For example, the address information 113d may include the information as depicted in FIG. 2.

Figure 2:
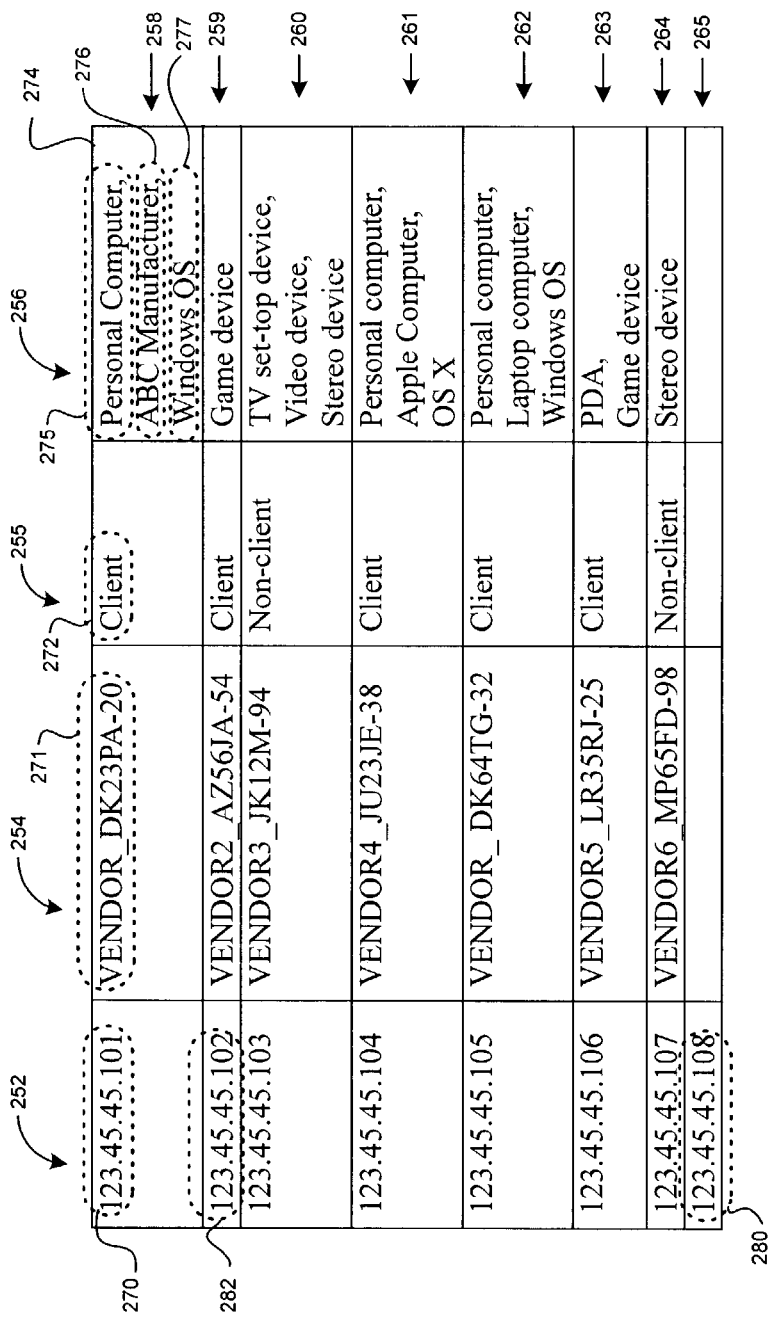
FIG. 2 is a diagram showing an example of network address information that is used by a communications system capable of establishing access control for a device used in a home network.

As shown in FIG. 2, address information 250 includes IP address information 252, device identifier information 254, device type 255, and device class 256 for each device 258-265 to which a network address has been assigned. For example, device 258 is associated with an IP address 270 of "123.45.45.101," a device identifier 271 of "VENDOR_DK23PA-20," a device type 272 of "Client," and a device class 274 that includes three device classes 275 ("Personal Computer"), 276 ("ABC Manufacturer") and 277 ("Windows OS"). As designated by device classes 275 and 277, the device 258 is a personal computer with Windows™ OS, such as the personal computer with Windows™ OS 112a of FIG. 1. The IP address 270 is associated with more than one device class. Specifically, the IP address 270 is associated with the device class 275 of the "Personal computer" hardware type, the device class 276 of a particular vendor (here, "ABC Manufacturer"), and the device class 277 of a particular platform (here, "Windows OS").

The device 259 is associated with the device class of "Game device," as is device 263. The device class "Personal computer" is associated with devices 258, 261, and 262. The device class "Stereo device" is associated with devices 260 and 264. The device class "Video device" is associated with device 260.

The address information 252 also includes an unassigned IP address 280 that is available to be assigned to another device. As illustrated by FIG. 2, eight of the nine IP addresses available to the local proxy 113 have been assigned.

Other types of data management techniques also may be used. For example, the local proxy 113 may identify the IP address assigned to a device in device information 113*c* rather than having a separate data structure, such as address information 113*d*. The inclusion of the network address assigned in device information 113*c* may result in improved efficiency with respect to address management.

Figure 3:
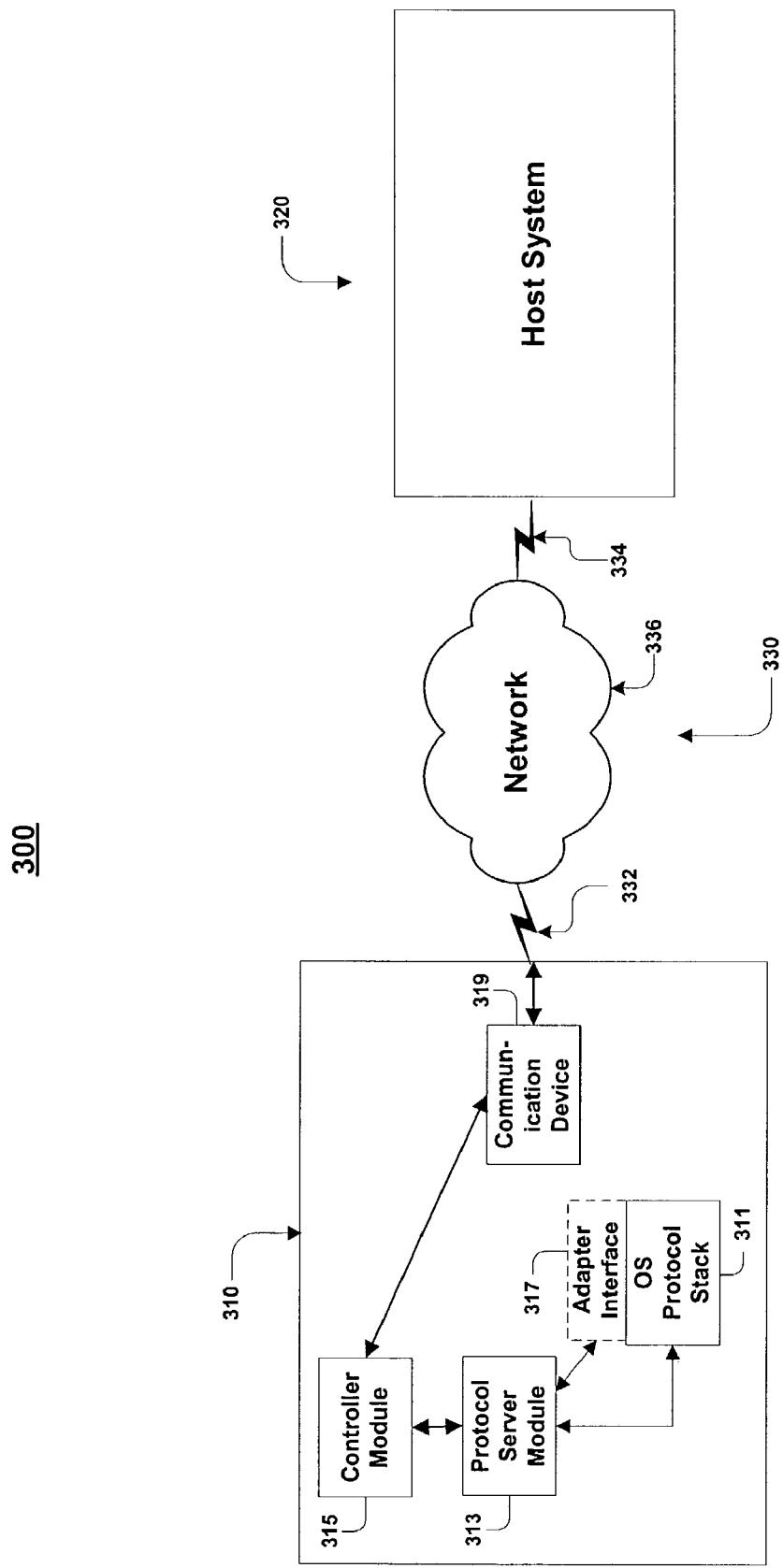

FIG. 3 shows an implementation of a communications system 300 that includes a client system 310, a host system 320, and a communications link 330. The client system 310 includes an OS protocol stack 311, a protocol server module 313, a controller module 315, an optional adapter interface 317, and a communications device 319. The OS protocol stack 311 is included as part of an operating system ("OS") and enables the OS to encapsulate data for communication. In general, the OS protocol stack 311 may be implemented using a PPP ("Point-to-Point Protocol") interface. For example, a Windows™ OS generally includes a NDISWAN ("Network Device Interface Specification for Wide Area Networks") component that functions as the PPP interface. In some Windows™ OSs and in some other types of OSs, a PPP Daemon (PPPD) may function as the PPP interface.

The protocol server module 313 interfaces with the client device OS protocol stack 311 and the controller module 315. The protocol server module 313 enables the client system 310 and the host system 320 to communicate through the delivery network 336 using any one of several encapsulating protocols.

The protocol server module 313 intercepts and takes over a communications session that the OS protocol stack 311 attempts to initiate with the host system 320 using a first protocol. For example, the OS protocol stack 311 may start a communications session intending to negotiate and exchange configuration data with the host system 320 using the first protocol. Instead, the protocol server module 313 "spoofs" the host system 320 and intercepts the communications session from the OS protocol stack 311, rather than having the OS protocol stack 311 communicate directly with the host system 320. The spoofing typically is transparent to the OS protocol stack 311 and the host system 320. By capturing the communications session at the protocol server module 313, the protocol server module 313 can negotiate a separate or a substitute communications session with the host system 320 using a second protocol that is different from the first protocol. Based on this second protocol, data from the OS protocol stack 311 can be routed to the host system 320 over the separate or substitute communications session. The protocol server module 313 also spoofs the OS protocol stack 311 from the perspective of the host system 320 such that the host system 320 may unknowingly and/or unintentionally transmit to the protocol server module 313 under the second protocol the configuration and/or other data that is destined for the OS protocol stack 311. The protocol server module 313 then transports this data to the OS protocol stack 311 using the first protocol.

Data packets that are destined to be communicated between the OS protocol stack 311 and the host system 320 are translated by the protocol server module 313 between the first protocol and the second protocol. For example, when the data packets include encapsulation, the protocol server module 313 may translate the data packets by removing the encapsulation from the data packets. Additionally or alternatively, the protocol server module 313 may translate the data packets by encapsulating previously unencapsulated data packets or re-encapsulating previously encapsulated data packets using any one of several communications protocols.

The protocol server module 313 may interface directly with the OS protocol stack 311, or the client system 310 may further include an interface adapter 317 that the protocol server module 313 uses to interface with the OS protocol stack 311. For instance, in some OSs in which the OS protocol stack 311 is implemented using a PPPD, the protocol server module 313 may interface directly with the PPPD without the need for an interface adapter 317. By contrast, in other OSs, such as the Windows™ OS, in which the OS protocol stack 311 is implemented using NDISWAN, the adapter 317 may be used to interface the protocol server module 313 and the NDISWAN protocol stack. More specifically, for example, a WAN ("Wide Area Network") Miniport adapter 317 may be used as a virtual modem to interface the protocol server module 313 and the NDISWAN.

In one implementation, the protocol server module 313 functions as a PPP ("Point-to-Point Protocol") server module. When the protocol server module 313 functions as a PPP server module, the protocol server module 313 may capture a PPP communications session between the OS protocol stack 311 and the host system 320. The PPP server module also negotiates a PPP communications session with the OS protocol stack 311 and translates PPP data packets from the OS protocol stack 311 destined for the host system 320. For example, the protocol server module 313 may translate the data packets by removing the PPP encapsulation. The data packets may include data packets in a format consistent with, for example, Internet Protocol (IP) data, Transmission Control Protocol (TCP) data, other data capable of being encapsulated by an encapsulating protocol, or a combination of these data formats. The data packets may include Layer Three data packets. After removing the PPP encapsulation, the PPP server module may encapsulate the packets in any one of several encapsulating protocols (e.g., PPP, UDP ("User Datagram Protocol"), L2TP ("Layer Two Tunneling Protocol"), and PPP over Ethernet ("PPPoE")). Additionally, the protocol server module 313 may translate data packets from the host system 320 by removing the encapsulation from the data packets and encapsulating the packets in PPP, and then may transport the packets to the client device OS protocol stack 311.

The protocol server module 313 may append parental control information to packets of data prior to transporting the packets to the host system 320. For example, the protocol server module 313 may access parental control information (not shown) that is associated with the identity that is sending the communication using the client system 310 and that is stored, for example, on the client system 310. The accessed parental control information may be inserted in the communication and transported in the packets of data sent to the host system 320.

Additionally or alternatively, the protocol server module 313 may function to filter packets of data prior to transporting the packets to the host system 320. For instance, the protocol server module 313 may apply parental controls to communications sent using the client system 310 based on the identity that is sending the communication using the client system 310. This may be accomplished by accessing parental control information that is associated with the identity that is sending the communication and accessing an access control list of permitted or restricted addresses based on parental control information that is associated with the identity and that is stored on the client system 310.

The protocol server module 313 may be configured to enable the client system 310 to communicate with the host system 320 using various encapsulating protocols that are supported by the delivery network 336 and the host system 320, regardless of whether these protocols are otherwise supported by the client system 310. For instance, although a client system 310 may support only a PPP encapsulating protocol through its OS protocol stack 311, the protocol server module 313 may function to enable the client system 310 to communicate through the delivery network 336 with the host system 320 using other encapsulating protocols. In a more specific example, the protocol server module 313 generally enables the client system having only a PPP protocol interface to communicate with the host system 320 using, for example, L2TP, PPP, PPPoE, UDP tunneling, token tunneling (e.g., a P3 tunnel), any other encapsulating protocols and tunneling mechanisms, or a combination of these encapsulating protocols and tunneling mechanisms.

The protocol server module 313 may be implemented as a client application or as a software module within a client application. Examples of client applications include AOL ("America Online") client, a CompuServe client, an AIM ("America Online Instant Messenger") client, an AOL TV ("America Online Television") client, and an ISP ("Internet Service Provider") client capable of communicating with other computer users, accessing various computer resources, and viewing, creating, or otherwise manipulating electronic content. The encapsulation may be performed by the protocol server module 313, or alternatively, it may be performed by a separate client application (e.g., PPP client, UDP client, PPPoE client, L2TP client, or AOL client).

The controller module 315 may be logically connected to the protocol server module 313 and may be structured and arranged to control communications between the OS protocol stack 311, the protocol server module 313, and the host system 320. The controller module 315 may be implemented as a client application or as a software module within a client. Additionally, the controller module 315 may function to control the communications device 319.

The communications device 319 typically has the attributes of and includes one or more of the communications devices described above with respect to communications device 119 of FIG. 1.

The communications link 330 may include communications pathways 332 and 334 that enable communications through the one or more delivery networks 336. The delivery network 336 provides a direct or an indirect communications path between the client system 310 and the host system 320, irrespective of physical separation. Examples of a delivery network 336 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop"), HDSL ("High bit-rate Digital Subscriber Line"), and VDSL ("Very high bit-rate Digital Subscriber Line"), radio, TV, cable, satellite, and/or any other delivery mechanism for carrying data. Each of the communications pathways 332 and 334 may include, for example, a wired, wireless, cable or satellite communications pathway.

In the context of classifying devices, the protocol server module 313 may be referred to as a local proxy.

Figure 4:
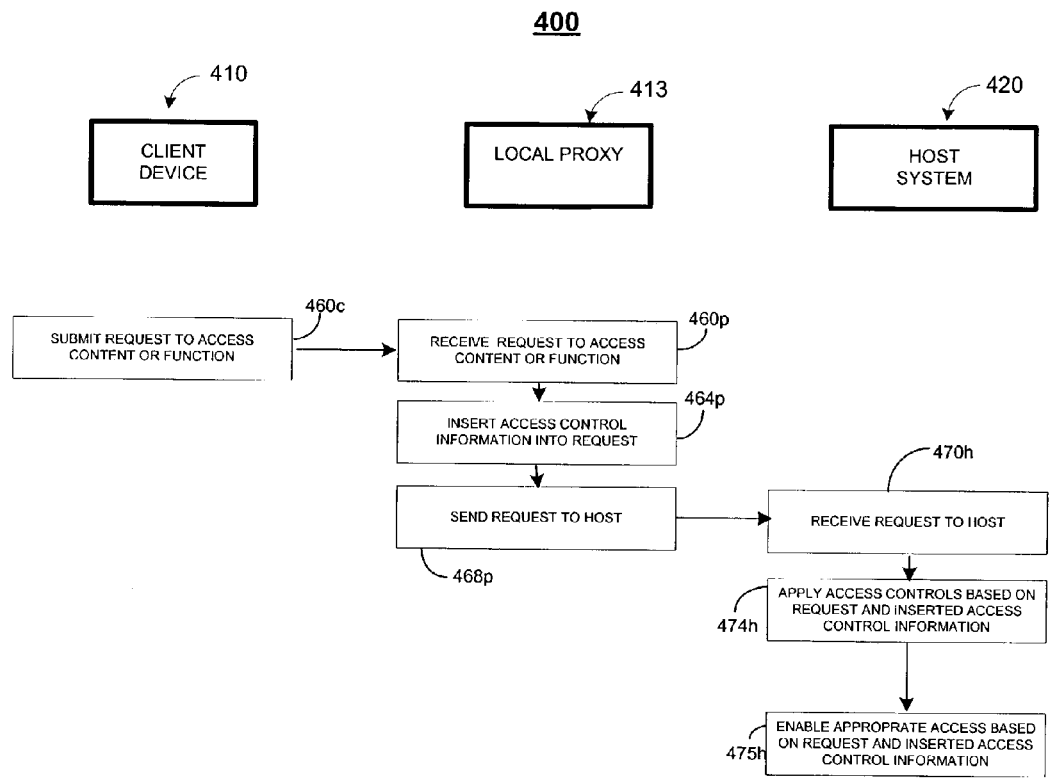
FIGS. 4, 5, 6, and 8 are block diagrams illustrating communications between a device, a local proxy server, and a host system to establish access controls for a device used in a home network.
Figure 5:
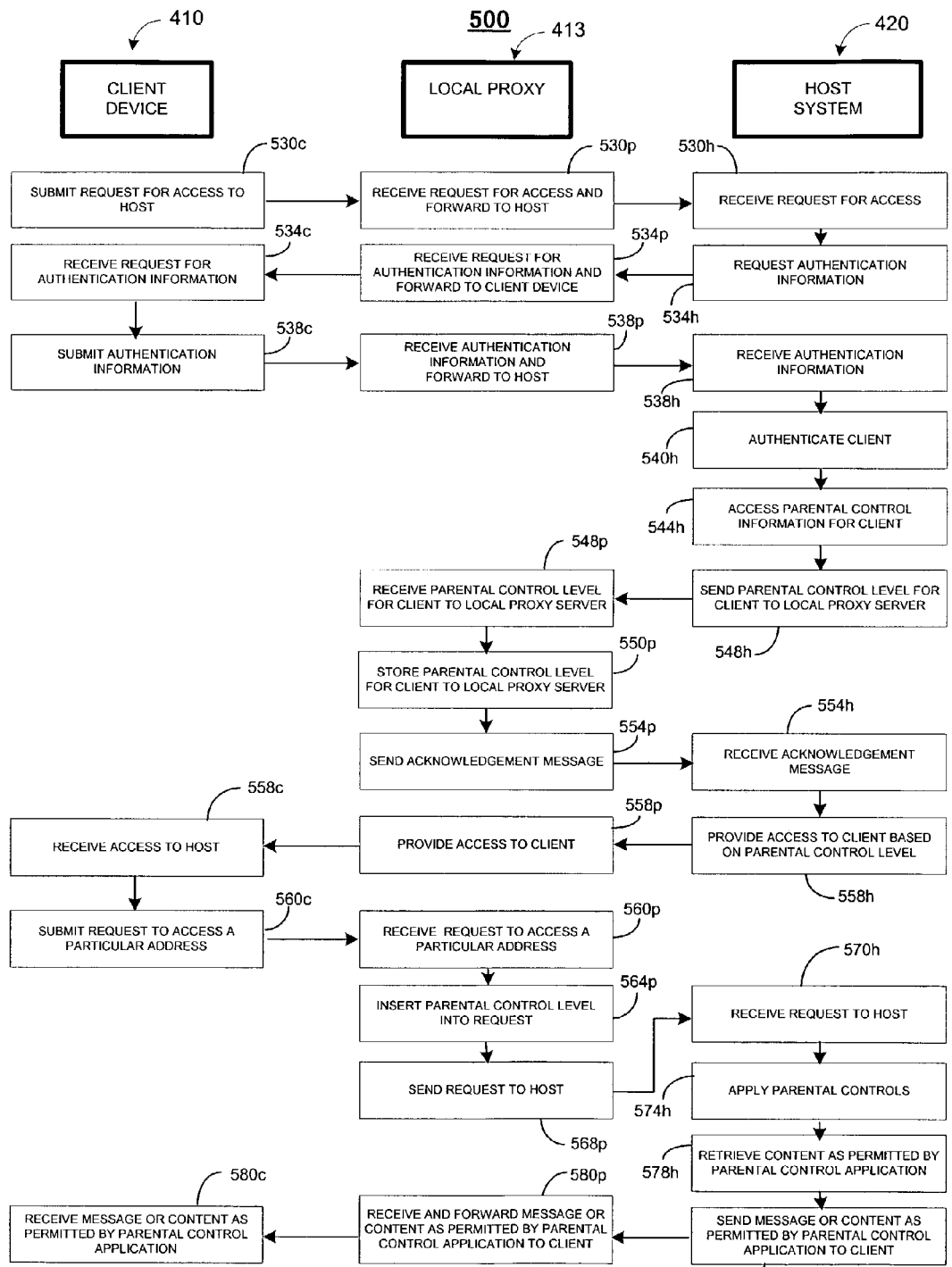

Referring to FIGS. 4 and 5, a procedure 400 or 500 may be used to enable parental controls for a device used in a home network. A client device 410, such as described previously, communicates to a local proxy 413. The local proxy 413 communicates with the host system 420.

Referring to FIG. 4, an exemplary procedure 400 may be used to enable parental controls for a device used in a home network when access control information associated with the parental controls and the device or the identity associated with the device is stored at the local proxy 413. The access control information may be a mirrored copy of access control information stored by the host system 420.

The procedure 400 begins when the client device 410 submits a request to access some content or a function accessible through the host system 420 (step 460*c*). The local proxy 413 receives the request to access the content or function (step 460*p*), and inserts into the request or otherwise associates with the request the access control information associated with the client device 410 or the identity using the client device 410 (step 464*p*). The local proxy 413 sends the request with the inserted access control information to the host system 420 (step 468*p*).

The host system 420 receives the request with the access control information (step 470*h*) and applies access controls based on the request and appended control information (step 474*h*). For example, the host system 420 may use an access control list that identifies whether the client device 410 or the identity using the client device 410 may access the requested content or function. The host system 420 enables appropriate access based on the request and the access control information (step 475*h*).

Referring to FIG. 5, a procedure 500 is a more specific example of a process to enable parental controls for a device used in a home network. The procedure 500 begins when the client device 410 submits a request for access to the host system 420 (step 530*c*). The local proxy 413 receives the request for access and forwards the request to the host system 420 (step 530*p*).

The host system 420 receives the request for access (step 530*h*) and requests authentication information if not previously provided (step 534*h*). The local proxy 413 receives the request for authentication information and forwards the request to the client device 510 (step 534*p*).

The client device 410 receives the request for authentication information (step 534*c*) and submits authentication information (step 538*c*). For example, the client device 410 may submit a screen name and a password or other authenticating information. The local proxy 413 receives the authentication information and forwards the authentication information on to the host system 420 (step 538*p*).

The host system 420 receives the authentication information (step 538*h*) and authenticates the client device 410 (step 540*h*). If the host system 420 determines that the identity associated with the client device 410 is not an authenticated user, the host system may take any of several actions, including terminating the session immediately, sending a message to the client device 410, or sending a message to a master or supervisory account associated with the local proxy 413.

When the host system 420 determines that the identity associated with the client device 410 is an authenticated user, the host system 420 accesses parental control information for the identity associated with the client device 410 (step 544*h*). For example, the host system 420 may determine the parental control level associated with the identity associated with the client device 410. This may be accomplished, for example, by using a table indexed by screen name (or otherwise) to look up the parental control level associated with a particular screen name. As shown below, the table may identify an account, a password, and a parental control level associated with a screen name.

| Master Account | Screen Name   | Password   | Parental Control Level |
|----------------|---------------|------------|------------------------|
| SmithFamily    | Robert_Smith  | 5846%JYNG  | Adult                  |
| SmithFamily    | Suzie_Smith   | 6748#474V  | YoungTeen              |
| SmithFamily    | Bill_Smith    | JHG7868$0  | MatureTeen             |
| JonesFamily    | Greg_Jones    | 85775$#59  | Adult                  |

The host system sends the accessed parental control information for the identity associated with the client device 410 to local proxy 413 (step 548h). The local proxy 413 receives the parental control information for the identity associated with the client device 410 (step 548p) and stores the parental control information for the identity associated with the client device 410 in transient or persistent storage (step 550p). The local proxy 413 sends an acknowledgment message to the host system 420 (step 554p).

The steps 548h-554p may be referred to as mirroring parental control information. In some implementations, steps the same as or similar to steps 548h-554p may be performed independently of receiving a request for access to the host system from a client device. For example, the local proxy may request parental control information for one or more identities and/or one or more devices upon activation or connection to the host system.

The host system 420 receives the acknowledgment message (step 554h) and provides access to the client device 410 based on parental control information associated with the identity using the client device 410 (step 558h). The local proxy 413 provides access to client device 410 (step 558p), which receives access to the host system 520 (step 558c).

Upon receiving access to the host system, the client device 410 may submit a request to access the content or function associated with a particular address or a range of addresses (step 560c). The local proxy 413 receives the request (step 560p), and inserts into or otherwise associates with the request the parental control level for the identity using the client device 410 (step 564p). For example, the local proxy 413 may look up the parental control information (here, the parental control level) that the local proxy 413 stored in step 550p and append the parental control information (here, the parental control level) to the request received in step 560p. The local proxy 413 sends the request with the inserted parental control information to the host system 420 (step 568p).

The host system 420 receives the request with the parental control information (step 570h) and applies parental controls (step 574h). For example, the host system 420 may access an access control list that identifies the addresses to which a particular parental control level is permitted or denied access, as depicted in the table below.

An address that occurs within the range of addresses (here, the range 123.45.67.000 to 123.45.67.999 is indicated by 123.45.67.*) may be accessed by the adult and mature teen parental control levels and may not be accessed by the young teen and child parental control levels. An address that occurs within the range of addresses as indicated by 123.45.68.* (here, 123.45.68.000 to 123.45.68.999) may be accessed only by the adult parental control level and may not be accessed by a mature teen, young teen or child parental control level.

Some implementations may use different data management techniques. For example, the parental control level of adult may not be controlled, and that level may not appear on any access control list for that reason. For example, a particular access control list may include the addresses that are associated with a particular parental control level (e.g., an access control list for a mature teen, another access control list for a young teen, and yet another access control list for a child). Some implementations may include the addresses that a particular parental control level may not access, which may be referred to as a block list or black list for a particular parental control level. Similarly, a particular access control list may include the addresses that a particular parental control level may access, which may be referred to as a white list for a particular parental control level. For example, an access control list may contain the list of addresses that may be accessed by a mature teen, and another access control list may contain the list of addresses that may not be accessed by a young teen.

Alternatively, some implementations may only apply parental controls to communications from client devices when the parental control level associated with the screen name of the identity using the client device corresponds to a particular level or a set of particular levels. In such a case, step 574h may be unnecessary and/or redundant, and therefore may not be performed. For example, when a host system uses parental control levels of adult, mature teen, young teen, and child, the host system may only apply parental controls to communications from client devices when the parental control level associated with the screen name of the identity using the client device is a mature teen, young teen or child, and may not apply parental controls to communications when the parental control level is an adult. In this case, step 574h would not be performed for a device with adult-level access.

The host system 420 retrieves the content as permitted by the parental control application (step 578h). That is, when the application of parental controls in step 574h allows the identity to access the address requested, the host system 420 retrieves the content associated with the address requested (e.g., the World Wide Web page associated with a particular Internet address). When the application of parental controls

| Address     | Adult Allowed | Mature Teen Allowed | Mature Teen Not Allowed | Young Teen Allowed | Young Teen Not Allowed | Child Allowed | Child Not Allowed |
|-------------|---------------|---------------------|-------------------------|--------------------|------------------------|---------------|-------------------|
| 123.45.67.* | X             | X                   |                         |                    | X                      |               | X                 |
| 123.45.68.* | X             |                     | X                       |                    | X                      |               | X                 | in step 574*h* does not allow the identity of the client device 410 to access the requested address, step 578*h* is not performed.

Some implementations may use one or more heuristic or algorithmic procedures to analyze the content associated with the received address after retrieval to determine whether the content is appropriate for one or more particular parental control levels. For example, a list of keywords may be associated with prohibited content for a particular parental control level or a set of particular parental control levels. When the content is not appropriate for the parental control level of the identity associated with the client device 410, the content is not sent to the local proxy 413.

When the identity associated with the client device 410 is permitted to access the requested address and/or the content or a function associated with the requested address, the host system 420 sends the content to the local proxy 413 (step 580*h*). The local proxy 413 receives and forwards the content to client device 410 (step 580*p*). The client device 410 receives the content (step 580*c*).

When the identity associated with the client device 410 is not permitted to access the requested address and/or the content or a function associated with the requested address, the host system 420 sends a message indicating that access is not permitted to the local proxy 413 (step 580*h*). The local proxy 413 receives and forwards the message indicating that access is not permitted to the client device 410 (step 580*p*), and the client device 410 receives the message (580*c*).

In some cases, the local proxy 413 may apply the parental controls. For example, the local proxy 413 may be used to restrict communications based on one or more access control lists (e.g., in a step similar to step 574*h*) and/or heuristic or algorithmic procedures (e.g., in a step similar to step 578*h*). The application of parental controls by the local proxy 413 may be advantageous. For example, the local proxy 413 may regulate local content and services provided by the home network, such as the application of parental controls to internal communications between devices (e.g., device-to-device communications).

Figure 6:
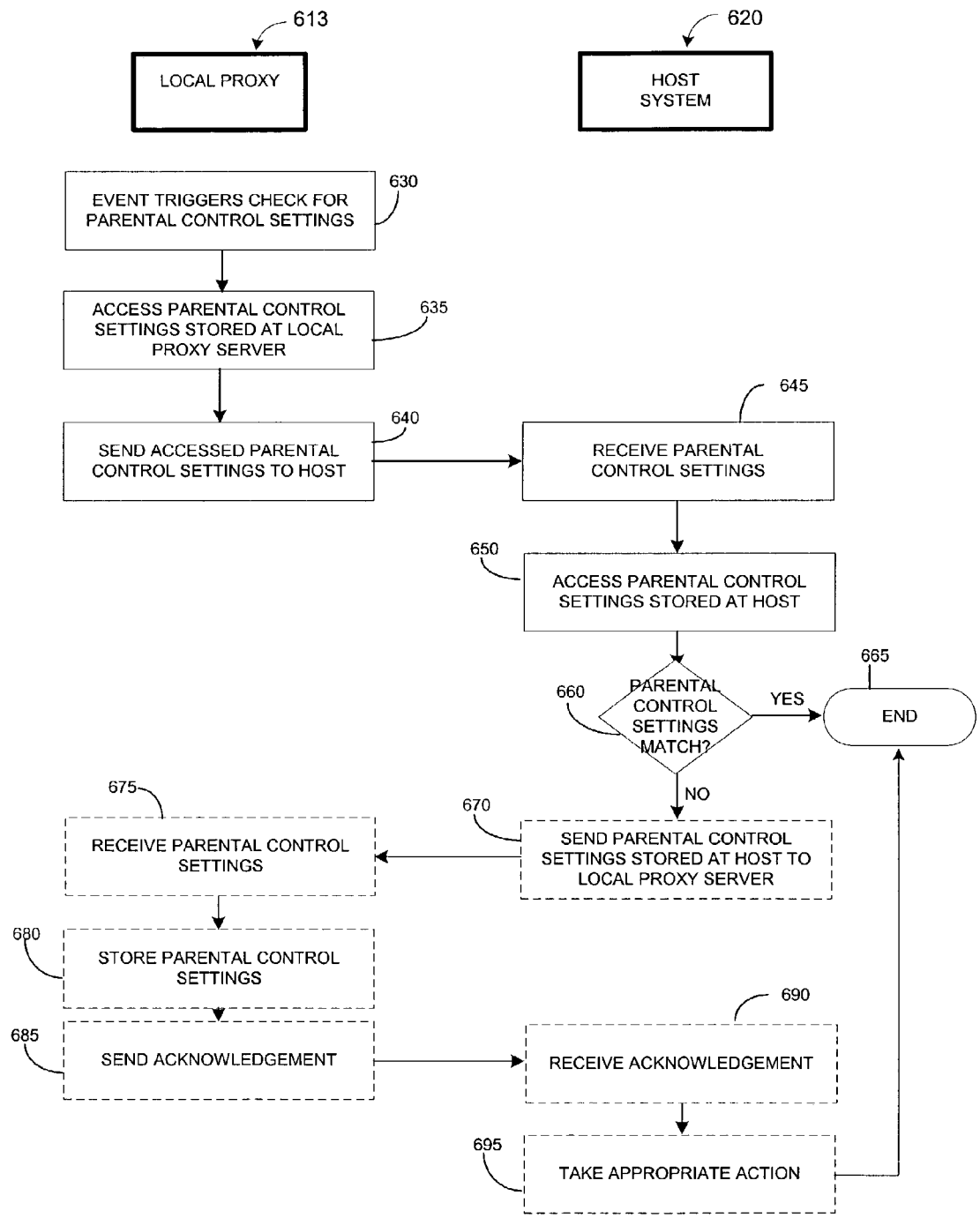

Referring to FIG. 6, a procedure 600 may be used to enable parental controls for a device used in a home network by mirroring host-based parental control settings on the home network. The procedure 600 may be used when parental control settings are stored on a local proxy. The mirroring of host-based parental control settings on the local proxy allows a comparison between the parental control settings on the host system and the locally-stored parental control settings, which may help detect when local parental control settings have been improperly modified or accessed.

Parental control settings may include, for example, the parental control information (such as a parental control level) associated with screen names, and information identifying an account (such as an email address) to which a message should be sent when parental control settings on local proxy 613 do not match parental control settings on the host system 620. Parental control settings for one or more screen names that use local proxy 613 to access the host system 620 may be grouped or otherwise associated with local proxy 613. For example, parental control settings for the screen names may be associated with a particular master user account (such as a family account) or may be associated with local proxy 613. In addition, or as an alternative, some implementations may include parental control information associated with devices connected to the home network, including a client device such as a Windows™ OS personal computer 112*a*, a game device 112*b*, a Macintosh™ personal computer 112*c*, and a PDA 112*e*, or a non-client device, such as an intelligent home appliance 112*f*, as described with respect to FIG. 1.

A local proxy 613 communicates with the host system 620 to mirror parental control settings. The procedure 600 begins when an event triggers a check for parental control settings at the local proxy server (step 630). Such an event may include, for example, the local proxy 613 establishing a new connection to the host system 620, a new user of a device logging into the host system 620, a designated user triggering a parental control setting check, a predetermined amount of time passing since the last time a parental control setting check was performed, or a predetermined number of logons occurring since the last time a parental control setting check was performed.

Alternatively or additionally, whether a check for parental control settings is appropriate and/or useful and should be triggered may be determined by the local proxy 613, the host system 620, or another computing device. For example, decision logic that identifies the conditions under which parental control information should be checked may be executed by the local proxy 613.

The local proxy 613 accesses parental control settings stored at the local proxy 613 (step 635). In some cases, the parental control settings may be stored on a storage device that is peripheral to the local proxy 613, such as a peripheral storage device (including a drive, a microdrive, a compact disk (CD), a CD-recordable (CD-R), a CD-rewriteable (CD-RW), flash memory, or a solid-state floppy disk card (SS-FDC)).

The local proxy 613 sends the accessed parental control settings to the host system 620 (step 640). The parental control settings for one or more screen names associated with the local proxy 613 may be sent. In addition or as an alternative to the parental control settings themselves, some implementations may send a checksum that is a number representing the parental control settings transferred from the local proxy 613 to the host system 620.

The host system 620 receives the parental control settings (step 645) and accesses the parental control settings stored at the host system 620 and associated with the local proxy 613 (step 650). The host system 620 compares the parental control settings stored at the host system 615 with the parental control settings received from the local proxy 613 (step 660). To do so, the host system 620 may transform the parental control settings into a checksum using the same procedure used by the local proxy 613 to compute the checksum. When the parental control settings (either the parental control settings themselves or the computed checksums that represent the parental control settings on the local proxy 613 and the host system 620, respectively) match, the procedure 600 ends (step 665).

Alternatively, when the parental control settings sent by the local proxy 613 and accessed by the host system 620 do not match, the host system 620 sends the correct parental control settings to the local proxy 613 (step 670). The local proxy 613 receives the parental control settings (step 675), stores the parental control settings (step 680), and sends an acknowledgement message to the host system 620 (step 685). The host system 620 receives the acknowledgement message (step 690).

Additionally or alternatively, when the parental control settings sent by the local proxy 613 and accessed by the host system 620 do not match, the host system 620 may take other appropriate action (step 695) before ending the procedure (step 665). Such action may include, for example, notifying the master account holder and terminating access to the host system, as described below with respect to FIG. 7.

Figure 7:
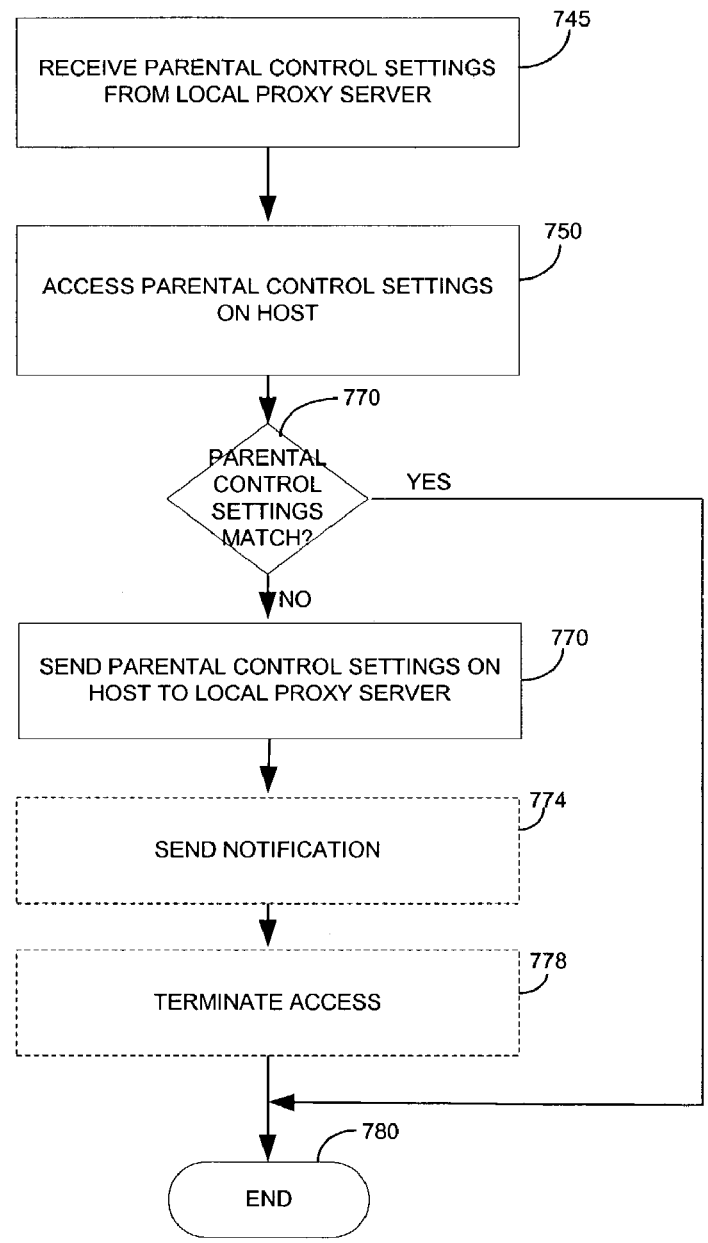
FIGS. 7 and 9 are flow charts of processes performed to establish access controls for a device used in a home network.

Referring also to FIG. 7, a process 700 to mirror parental control settings from a host system 720 may begin when the host system 720 receives parental control settings (step 745). For example, the local proxy 713 may submit parental control settings in the manner described previously with respect to item 640 in FIG. 6.

The host system 720 accesses parental control settings (step 750) and compares the parental control settings received from the local proxy 713 to the parental control settings accessed on the host system 720 (step 760). For example, host system 720 may access parental control settings in the manner described previously with respect to step 650 in FIG. 6 and compare the parental control settings in the manner described previously with respect to item 660 in FIG. 6.

When the parental control settings do not match, the host system 720 sends parental control settings accessed on the host system 720 to the local proxy 713 (step 770), such as in the manner described previously with respect to item 670 in FIG. 6.

The host system 720 also sends one or more notification messages (step 774). For example, the host system 720 may send a notification message to the holder of the master account that is associated with the local proxy 713, to a home network manager that is associated with the local proxy 713, and/or the screen name associated with a device (when the trigger is associated with one or more identities or devices (e.g., the log on of a new device or new user)). The notification message may constitute an email message, a voice mail message when digital voicemail is integrated into the home network system, an instant message (IM), or another type of alert. The notification message also may be sent to an address provided by the holder of the master account (e.g., a parent's email address at work).

Some implementations may only send one or more notifications when a particular number of changes to parental control settings have occurred or when the frequency of changes to parental control settings has reached a predetermined threshold level.

In some implementations, the host system 720 may terminate access (step 778). For instance, the user session or proxy connection may be terminated when the parental control settings do not match or when the frequency or number of changes to parental control settings has reached a predetermined threshold level.

When the parental control settings received and accessed by the host system 720 match, the procedure 700 ends (step 780).

Alternatively or additionally, the parental control settings may be mirrored between a local proxy and a removable storage device (such as a drive, a microdrive, a compact disc ("CD"), a CD-recordable disk ("CD-R"), a CD-rewriteable disk ("CD-RW"), a flash memory, or solid-state floppy disk cards) using any storage media (including magnetic, optical, or solid state storage media).

Figure 8:
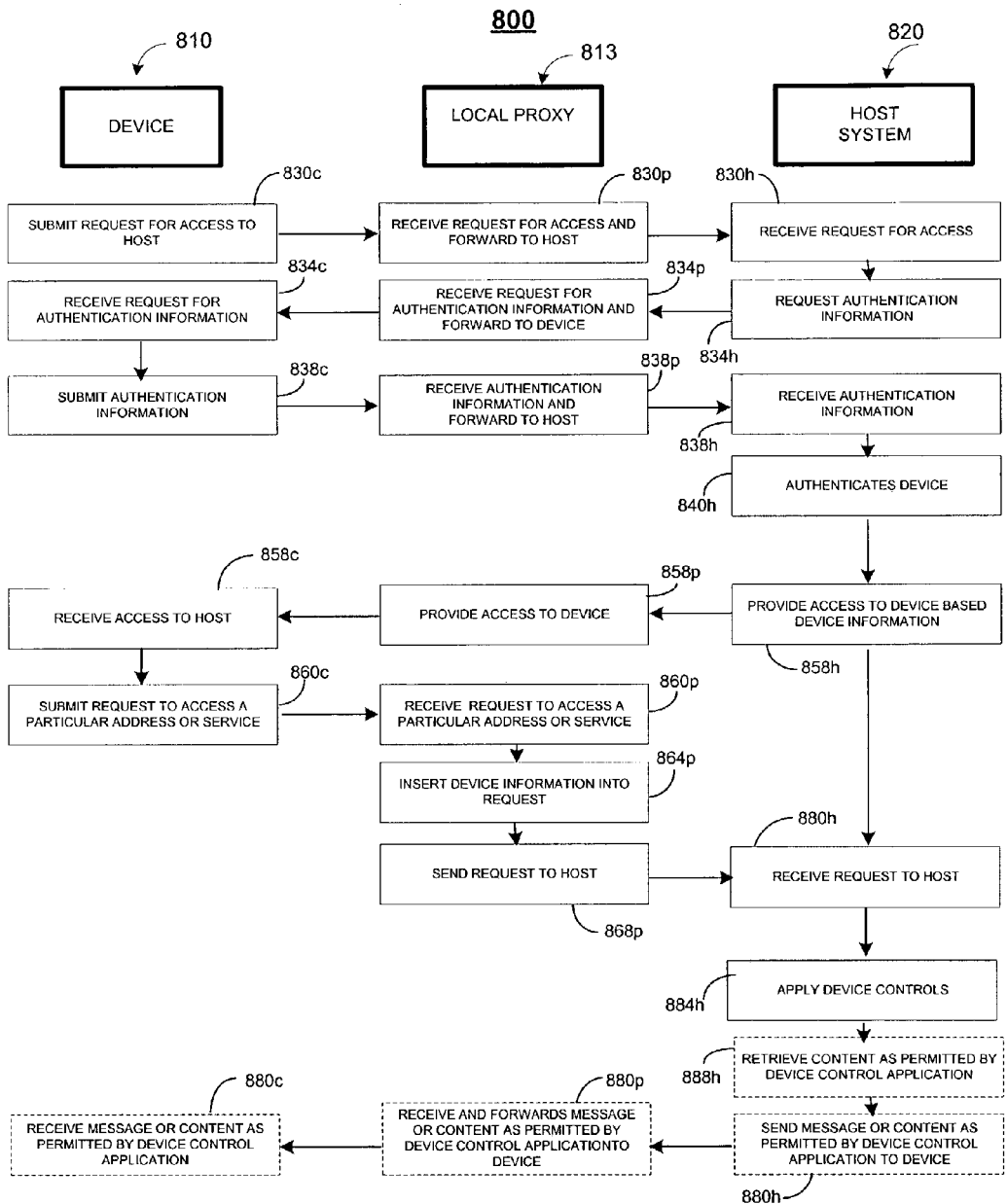

Referring to FIG. 8, a procedure 800 may be used to identify a device used in a home network. A device 810 may be a client device as described above or a non-client device as described above. Device 810 communicates with a local proxy 813. The local proxy 813 communicates with the host system 820.

The procedure 800 begins when the device 810 submits a request for access to the host system 820 (step 830c). The local proxy 813 receives the request for access and forwards the request to the host system 820 (step 830p).

The host system 820 receives the request for access (step 830h) and requests authentication information (step 834h). The local proxy 813 receives the request for authentication information and forwards the request to the device 810 (step 834p).

The device 810 receives the request for authentication information (step 834c) and submits the authentication information (step 838c). For example, the device 810 may submit a screen name and password or other authenticating information. The local proxy 813 receives the authentication information and forwards the authentication information to the host system 820 (step 838p).

The host system 820 receives the authentication information (step 838h) and authenticates the device 810 (step 840h). When the host system 820 determines that the device 810 or the identity associated with the device 810 is not authenticated, the host system may take any of several actions, including terminating the session immediately, sending a message to the device 810, or sending a message to an email address that is associated with the parental control information. Some implementations may, for example, send an email message to a master or supervisory account associated with the local proxy 813.

When the host system 820 determines that the device 810 or the identity associated with the device 810 is authenticated, the host system 820 provides access to the device 810 based on parental control information associated with the identity using the device 810 (step 858h). The local proxy 813 provides access to device 810 (step 858p), which receives access to the host system 820 (step 858c).

The device 810 submits a request to access a particular service associated with the host system 820 or a particular address accessible to the host system 820, such as a publicly-accessible IP address (step 860c).

The local proxy 813 receives the request to access the service or IP address (step 860p) and inserts the device information associated with the device 810 into the request (step 864p). For example, the local proxy 813 may look-up device information stored on the local proxy 813 (such as the device information described previously with respect to item 113c in FIG. 1) and insert the device information or a subset of the device information to the request received in step 860p. The local proxy 813 sends the request with the inserted device information to the host system 820 (step 868p).

The host system 820 receives the request with the device information (step 870h) and applies device controls based on the device information received (step 874h). For example, the host system 820 may provide access to a subset of services (such as system functions, features or content) accessible to only particular types of platforms or operating environments. As one example, access to particular entertainment services (such as games) may only be available to particular classes of devices (such as gaming devices and personal computers). To provide access to a subset of services, the host system 820 may look up on an access control list a list of services that are associated with the device class indicated by the received device information. The host system 820 then may provide access only to the identified services, as depicted in the table below.

| Service | Device Class | Allowed | Not Allowed |
| --- | --- | --- | --- |
| Game Service | Gaming Device | X | |
| Game Service | Personal Computer | X | |
| Game Service | PDA | | X |
| Financial Planning Service | Gaming Device | | X |
| Financial Planning Service | Personal Computer | X | |
| Financial Planning Service | PDA | | X |

The table above illustrates that a gaming device is allowed only to access the game service, a personal computer is allowed to access the game service and the financial planning service, and a PDA is not allowed access to the game service or the financial planning service. Some implementations may use an access control list by a device type (e.g., client device or non-client device), a platform, an operating environment, or another manner used to classify devices. In some cases, access control lists may be provided for particular devices. For example, an access control list may be based on a unique identifier for the device on the network, such as a MAC address or an IP address.

Alternatively, the host system 820 may provide a set of common services to all devices and provide access to additional services to particular types of devices. Additionally or alternatively, access control for a device may be based on a parental control level associated with the device in the same or a similar manner to the parental control levels associated with an identity.

Some implementations may use different data management techniques. Some implementations may include the services that a particular device class, device type, platform, operating environment, or individual device may not access (e.g., a block list) or may access (e.g., a white list).

The host system 820 also may provide certain host-maintained preferences, such as personal identification settings, personal web pages, account information, wallet information, and/or financial information only to devices that are capable of receiving that information. To do so, the host system 820 may look-up a list of information that is accessible by the type of device indicated by the received device information and provide access to the appropriate information based on the device type.

When the request by the device 810 is to retrieve content, the steps 878h to 880c are performed. The host system 820 retrieves the content as permitted by the device controls application (and permitted by security constraints enforced by the host system 820) (step 878h). For example, the host system 820 may look up the address of the content requested to determine whether the device is permitted to access the content in a manner similar to that described above with respect to step 874h. That is, when the application of device controls in step 874h allows the device to access the address requested, the host system 820 retrieves the content associated with the address requested (e.g., the World Wide Web page associated with a particular Internet address). When the application of device controls in step 874h does not allow the device 810 to access the requested address, step 878h is not performed.

As permitted by the application of device controls, the host system 820 sends the content to the device 810 (step 880h). Alternatively, the host system may send a message that explains that the requested content is not accessible by the device. When the device 810 is permitted to access the requested address and/or the content associated with the requested address, the content (or message) is sent to the local proxy 813 (step 880h), which receives and forwards the content (or message) to device 810 (step 880p). The device 810 receives the content (or message) (step 880c).

In some cases, the device 810 itself may not need to be authenticated, such as when the local proxy 813 has established a trusted connection with host system 820 and the device uses the established, trusted connection. In such a case, steps 830c-758c need not be performed.

Additionally or alternatively, device information may be appended to communications sent from or through the local proxy 813 during the establishment of a connection and/or authentication of the device 810, such as in steps 830p and 838p. Appending device information to such communications may be particularly beneficial when a host system 820 presents alternative information or features based on a specific communication platform or environment during or after authentication and before a specific access request has been received from the device.

In some implementations, the local proxy 813 may apply device controls, such as the device controls described with respect to steps 874h and 878h, to a received request, and may send to the host only requests to access permitted content or services.

Figure 9:
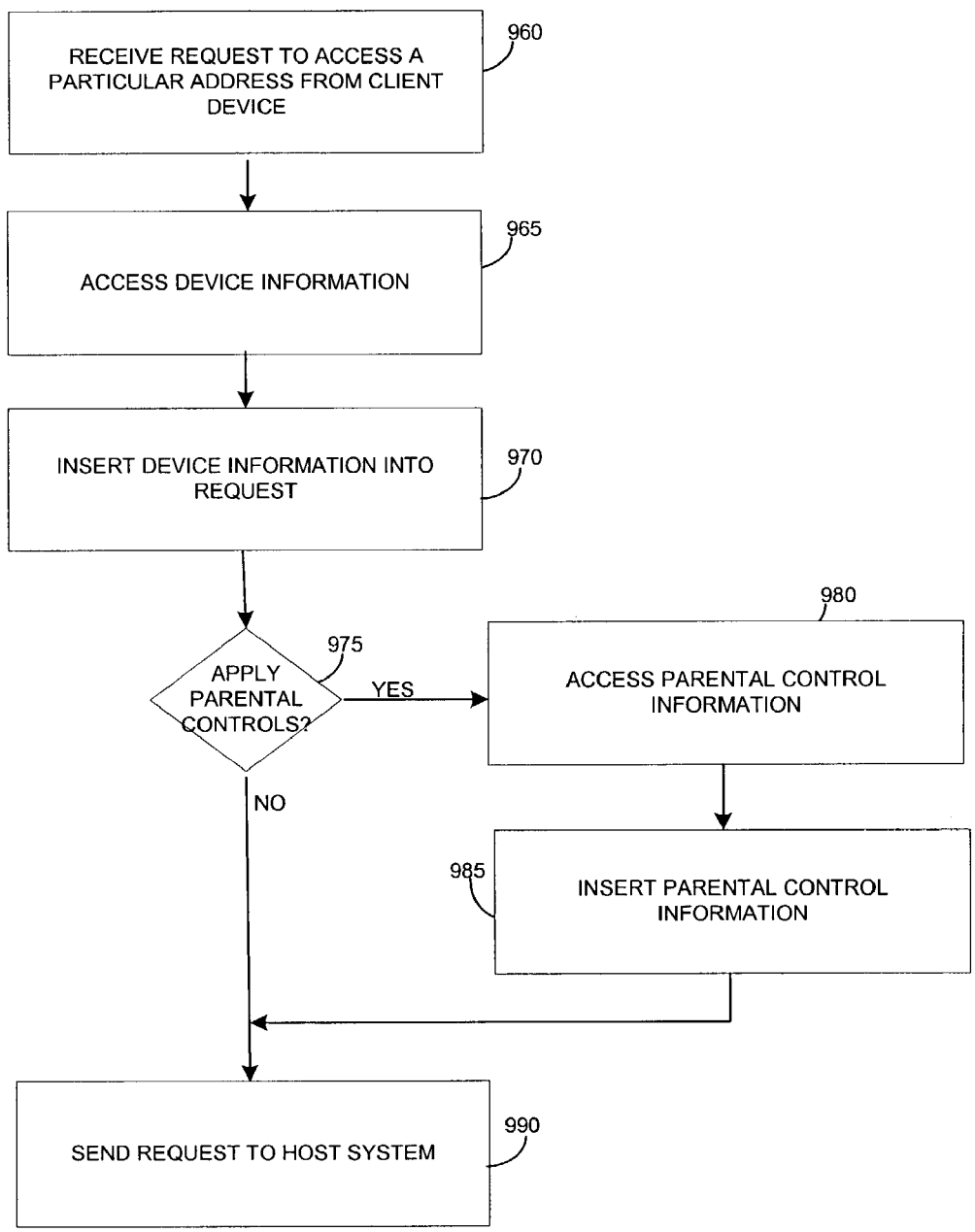

Referring also to FIG. 9, a process 900 to enable parental controls and device identification for a device used in a home network may begin when the local proxy receives a request to access a particular address from a device, such as a client device or a non-client device (step 960). The local proxy may receive the request in the same manner as or in a manner similar to that described previously with respect to step 560p in FIG. 5 and/or step 860p in FIG. 8.

The local proxy accesses device information associated with the device that sent the received request (step 965). The local proxy may, for example, access device information stored in a configuration table or list on the local proxy, a peripheral storage device associated with the local proxy, or another computing device accessible to the local proxy. The device information accessed may include a device identifier and device information associated with the device identifier, such as the type and/or class of device, the type of platform, or the operating system type and/or version, as described with respect to device information 113c in FIG. 1.

The local proxy inserts device information into the received request, appends the device information to the received request, or otherwise associates the device information with the received request (step 970). The device information may be the same as or based on the device information accessed. The device information inserted may be a subset of the device information accessed. For example, only the type of device and the platform may be inserted. The same device information values may be inserted as accessed, or the device information values may be transformed prior to insertion. For example, a configuration table stored on the local proxy may store the device type as "client" or "non-client" and the device type sent may be represented as "1" or "0". A translation table that may be stored on the local proxy may be used to transform the device information values.

The local proxy may determine whether to apply parental controls (step 975). For example, the host system may apply parental controls only when the client is a client device and may not apply parental controls when the device is a non-client device. The host system may apply different levels of parental controls (e.g., child, young teen, mature teen, and adult) based on the identity of the user using the device, a default level of parental control for a particular device, and/or a default level of parental control for all devices or other device types (e.g., client or non-client). Alternatively or additionally, the host system may apply parental controls when the client system is not included on a list or table that identifies the user identities or devices to which parental controls are not applied. Other data management techniques may be used, such as using a block list that identifies particular addresses that may not be accessed by a particular parental control level. Parental control information (such as whether to apply parental controls to a particular device and the association of a particular level parental control information with a particular device) that is used in determining whether to apply parental controls and for other uses may be stored on the local proxy, in a manner similar to other parental control information or device information as described with respect to parental control information 113a and device information 113c in FIG. 1.

When parental controls are applied, the local proxy accesses parental control information (step 980). The local proxy may access parental control information differently based on whether the device is a client device or a non-client device. For example, the local proxy may access parental control information associated with the identity using the client device, such as in a manner similar to the manner described with respect to step 544h in FIG. 5. The local proxy may, for example, access parental control information associated with a non-client device by accessing a configuration table or list stored on the local proxy that stores a default parental control level for each device.

The local proxy inserts parental control information into the received request (step 985). The local proxy may insert the parental control information or may transform the parental control information and insert the transformed parental control information.

The local proxy sends the request to the host system (step 990). This step is accomplished in the same or similar manner described with respect to step 568p in FIG. 5 or step 868p in FIG. 8.

Figure 10:
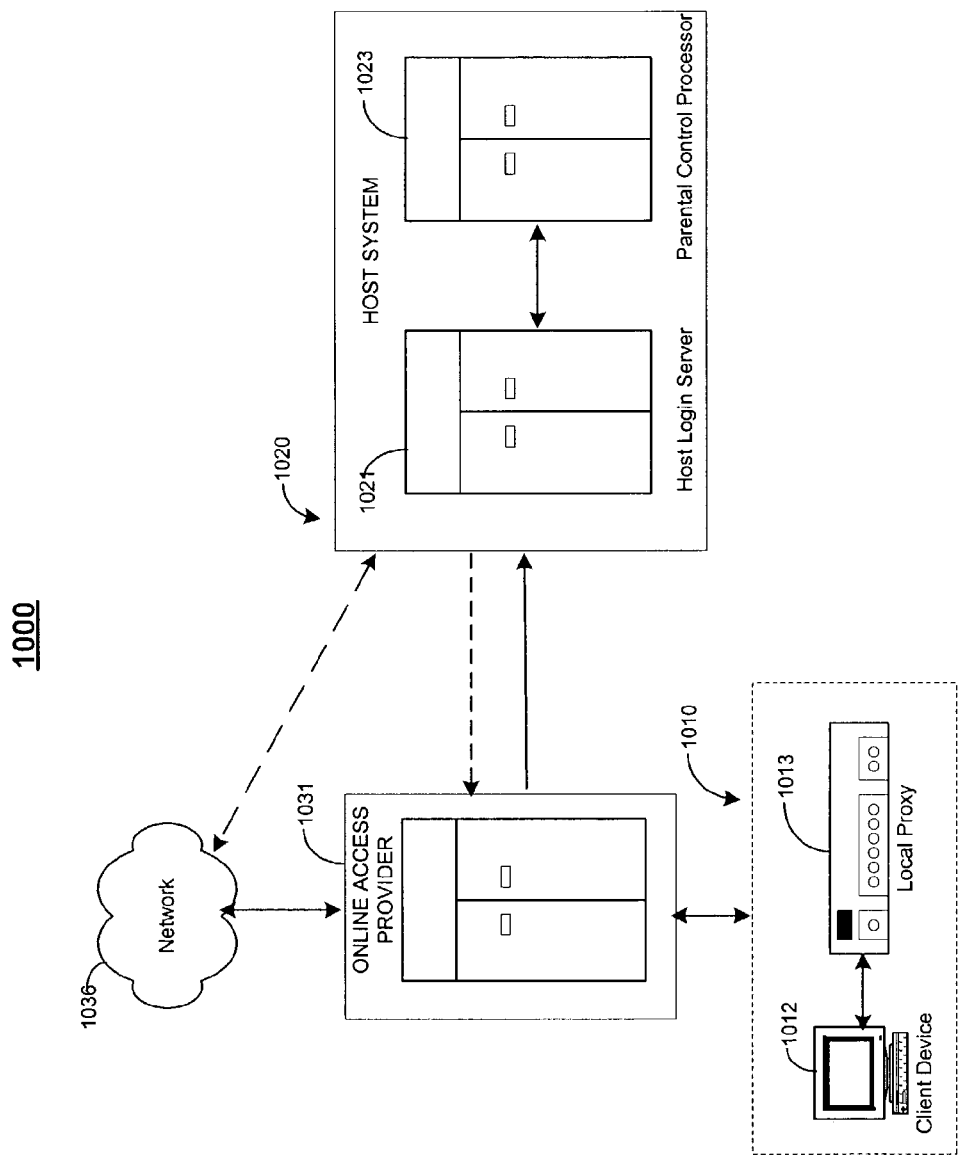
FIG. 10 is a block diagram illustrating a communications system capable of establishing access controls for a device used in a home network using a host system that applies access controls and does not provide online access to the home network.

FIG. 10 illustrates a communications system capable of establishing parental controls for a device used in a home network using a host system that applies parental controls and does not provide online access to the home network and/or its user. A home networking system 1000 includes a client system 1010 that has a client device 1012 and a local proxy 1013, a host system 1020 that has a host login server 1021 and a parental control processor 1023, an online access provider 1031, and a network 1036.

The local proxy 1013 stores parental control information, such as parental control information 113a described above with respect to FIG. 1. The local proxy 1013 may maintain a persistent connection to online access provider 1031. The persistent connection may be a broadband connection using, for example, a cable modem, such as cable modem 119c as described with respect to FIG. 1, or a DSL modem, such as DSL modem 119d as described with respect to FIG. 1. In some cases, the local proxy 1013 may apply parental controls to access requests from client device 1012. The local proxy may operate in a manner the same as or similar to the manner described above.

The online access provider 1031 provides client system 1010 with access to network 1036. The online access provider 1031 may be a host system such as described above. However, the online access provider 1031 leverages access controls from other systems, such as parental controls provided by host system 1020, for communications received from client system 1010. The online access provider 1031 routes communications to which parental controls need to be applied to host system 1020 for the application of parental controls.

The online access provider 1031 may retrieve content from network 1036 as permitted by the application of parental controls, and may provide the content to the client system 1010. In some implementations, the host system may retrieve the content from the network 1036 as permitted by the application of parental controls, and may provide the content to the online access provider 1031 for forwarding the content on to client system 1010. The network 1036 may be the same as or similar to network 130 in FIG. 1 or network 230 in FIG. 3.

Some implementations may use a transient connection (such as a narrowband or dial-up connection) from local proxy 1013 to online access provider 1031. In such a case, the local proxy 1013 and online access provider 1031 may exchange communications that include authentication messages used to establish a trusted connection, for example, such as described above with respect steps 530c-540h in FIG. 5 and steps 830c-840h in FIG. 8.

In some implementations, the online access provider may establish a persistent connection with host system 1020. A persistent connection may be particularly beneficial when the number of communications messages routed between the online access provider and the host system 1020 is greater than the capacity afforded by a transient connection that requires authentication to be performed when a connection is established. A persistent connection may improve the performance of the application of parental controls by the host system 1020 to communications that use access provided by the online access provider 1031.

The host system 1020 and the online access provider 1031 may be the same or different legal entities. Generally, the host system 1020 and the online access provider 1031 are different legal entities.

Figure 11:
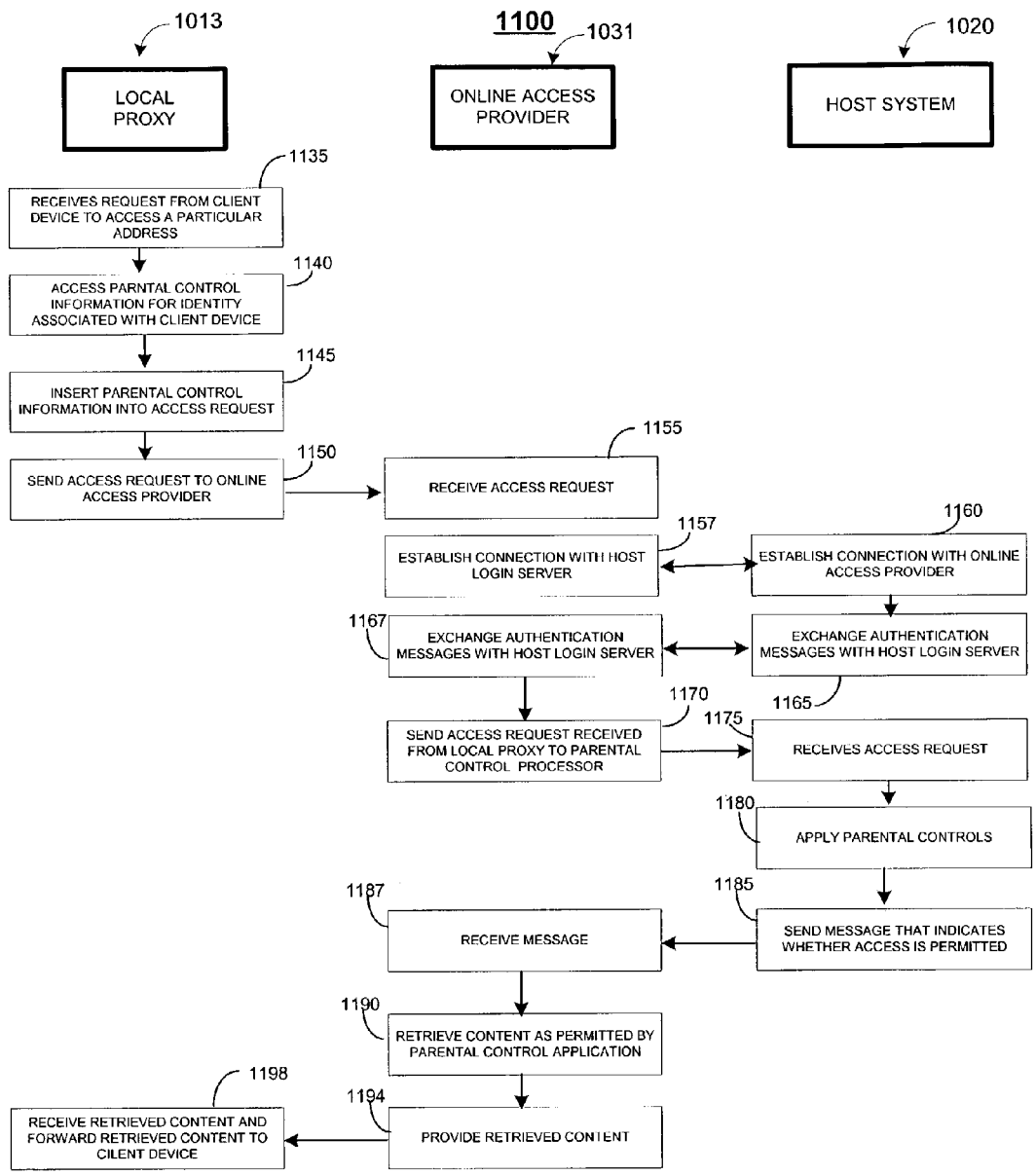
FIG. 11 is a block diagram illustrating communications between a local proxy, an online access provider, and a host system.

Referring to FIG. 11, a process 1100 establishes parental controls for a device used in a home network using a host system that applies parental controls and does not provide online access to the home network and/or its user.

The process 1100 begins when a local proxy 1013 receives a request to access a particular address from a client device such as described above (step 1135). The local proxy 1013 accesses parental control information for the identity associated with client device 1012 (step 1140) and inserts parental control information into the access request in a manner like or similar to the manner described with respect to FIG. 1 and step 564p in FIG. 5 (step 1145). The local proxy 1013 sends the access request to online access provider 1031 (step 1150).

The online access provider 1031 receives the access request (step 1155) and establishes a connection with the host login server 1021 of FIG. 10 or another component of host system 1020 used to login users (steps 1157 and 1160). The online access provider 1031 and the host system 1020 exchange communications to authenticate the online access provider 1031 in a manner like or similar to steps 530c-540h in FIG. 5 or steps 830c-840h in FIG. 8 (steps 1165 and 1167). The online access provider 1031 sends the access request received from the local proxy 1013 to the parental control processor 1023, or another component of host system 1020 used for applying parental controls (step 1170). The parental control processor receives the request (step 1175) and applies parental controls to the request (step 1180). This may be accomplished, for example, in a manner the same as or similar to steps 574h-580h in FIG. 5.

The parental control processor 1023 of the host system 1020 sends to online access provider 1031 a message that indicates whether or not the access request is permitted based on the application of parental controls (step 1185).

The online access provider 1031 receives the message (step 1187). When access is permitted, the online access provider 1031 retrieves the content from the network 1036 in a manner the same as or similar to the manner described with respect to step 578*h* in FIG. 5 (step 1190), and provides the retrieved content to the local proxy 1013 in a manner like or similar to the manner described with respect to step 580*h* in FIG. 5 (step 1194). When access is not permitted, the online access provider 1031 may send a message to local proxy 1013 indicating that access is not permitted (not shown).

The local proxy 1013 receives the retrieved content or message from the online access provider 1031 and forwards the content or message to the client device that requested access to the content (step 1198). This may be accomplished, for example, in the manner described with respect to step 580*p* in FIG. 5.

The client device receives the content or message from the local proxy 1013 (not shown). This may be accomplished, for example, in the manner described with respect to step 580*c* in FIG. 5.

Although FIG. 11 describes applying parental controls to a request to access a particular address, other implementations may apply parental controls to other access requests, such as a request to access one or more particular services provided by the online access provider 1031, information accessible on the online access provider 1031, or information or services otherwise accessible using online access provider 1031. Some implementations may apply parental controls to requests from a non-client device.

Figure 12:
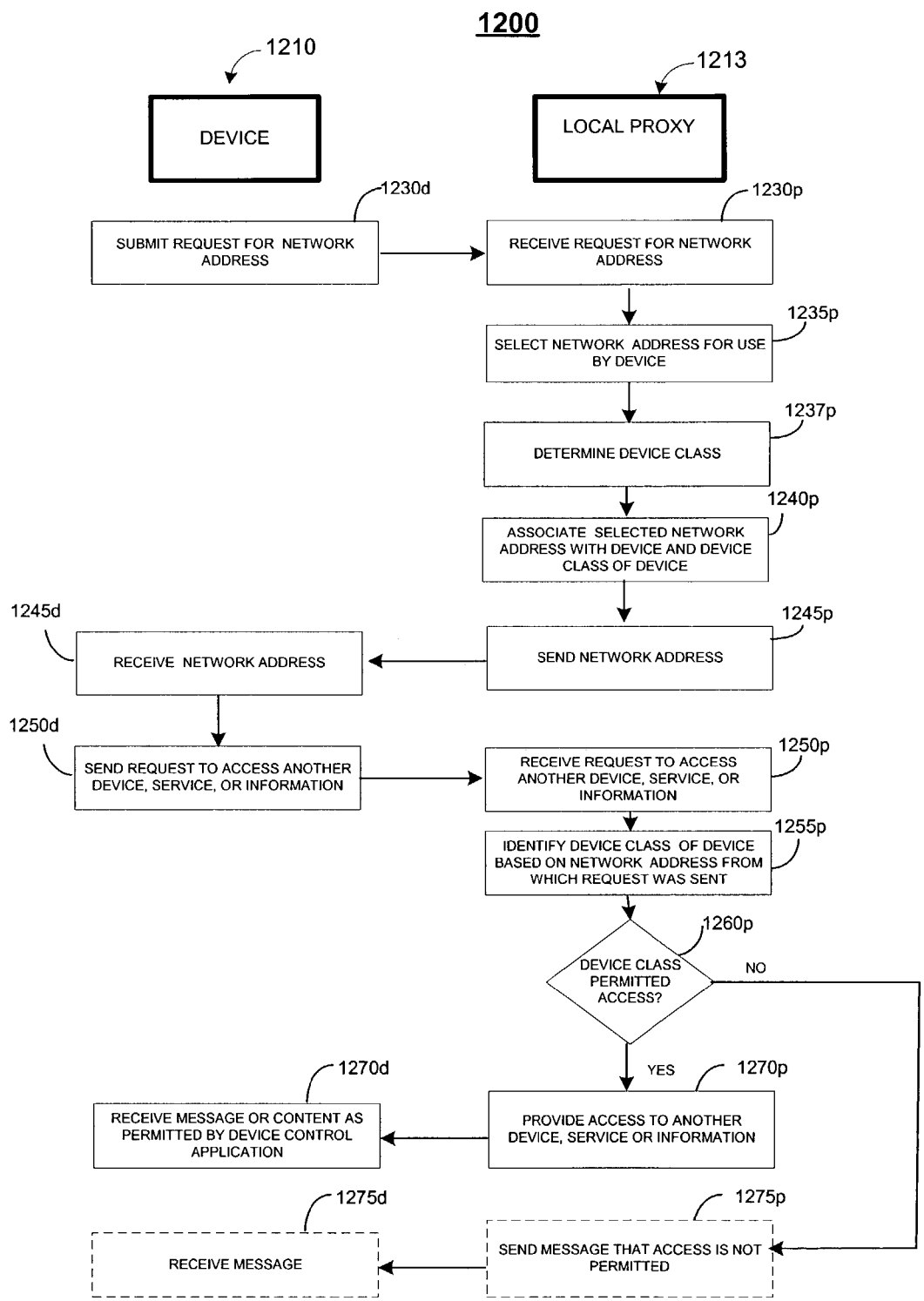
FIG. 12 is a block diagram process for identifying and classifying a device requesting a network address in a home network.

Referring to FIG. 12, a process 1200 may be used to identify and classify a device 1210 in a home network. A device 1210 may be a client device or a non-client device, both of which have been described above. The device 1210 communicates to a local proxy 1213, such as described above.

The process 1200 begins when the device 1210 submits a request to the local proxy 1213 for a network address (step 1230*d*). This may be accomplished, for example, through the use of the DHCP protocol in a home network that uses the transmission control protocol/internet protocol (TCP/IP). The TCP/IP software of the device 1210 may be configured to request, when the device 1210 is powered on, a network address from the local proxy 1213 that is configured to perform the function of the DHCP server. The registration request identifies the device 1210 that sent the request. For example, the registration request may include the MAC address of the device or another type of device identifier.

A network address may be assigned to a device in the home network each time the device powers on. After the device powers off, the network address previously assigned to the device is available for assignment to another device in the home network. This may be referred to as the dynamic assignment of a network address, and the network address so assigned may be referred to as a dynamic network address. The assignment of dynamic network addresses may reduce the number of network addresses needed in a home network such that fewer network addresses are needed than the number of devices on the network.

The local proxy 1213 receives the request for a network address (step 1230*p*) and selects a network address for use by the device 1210 (step 1235*p*). The selection of a network address may be accomplished, for example, when the local proxy 1213 accesses a list of network addresses, such as address information 113*d* of FIG. 1, to identify and select an unassigned network address.

The local proxy 1213 determines a device class for the device 1210 (step 1237*p*). The device class is determined based on the request for the network address. For example, when a device uses the DHCP to request a network address, the network address request may include configuration information. The configuration information included in the network address request may be used to determine a device class for the device that sent the request.

More specifically, a DHCP request for a network address includes configuration information (such as configuration parameters and other types of control information) in tagged data items that are stored in the options field of the DHCP request. The tagged data items may be referred to as options. The local proxy 1213 may determine a device class for the device 1210 based on the DHCP options used in the DHCP request. This may be accomplished, for example, when a particular option applies only to a particular operating system or a particular type of device. For example, when a DHCP request includes an option that is applicable only to a Windows™ operating system, the local proxy 1213 determines that the device class for the device 1210 is a Windows™ operating system-based personal computer. Similarly, when a DHCP request includes an option that is applicable only to a Macintosh™ operating system, the local proxy 1213 determines that the device class for the device 1210 is a Macintosh™ personal computer. In some cases, a DHCP option is applicable only to a game device. When a DHCP request includes such a DHCP option that is applicable only to a game device, the local proxy 1213 determines that the device class for the device 1210 is a game device. Protocols other than DHCP also may have artifacts included in protocol communications that enable similar identifications.

The local proxy 1213 associates the selected network address with the device 1210 and the device class (step 1240*p*). This may be accomplished, for example, when the local proxy 1213 accesses device information 113*c* for the device 1210 based on the device identifier received with the registration request. The device identifier, the selected network address, and the device class associated with the device 1210 may be stored collectively, for example, as address information 250, as described previously with respect to FIG. 2.

The local proxy 1213 sends the selected network address to the device 1210 (step 1245*p*), and the device 1210 receives the network address sent by the local proxy 1213 (step 1245*d*).

Subsequently, the device 1210 is used to request access to another device, service, or information (step 1250*d*), the access request including the network address of the device 1210.

The local proxy 1213 receives the access request (step 1250*p*) and identifies the class of device associated with the device 1210 through reference to the address information 250 used to associate device class with the network address by dynamically assigned during the session (step 1255*p*). More specifically, this may be accomplished, for example, by accessing in address information 113*d* the device class associated with the network address for the device 1210 that is included in the access request.

The local proxy 1213 determines whether the device 1210 may receive the requested access based on the device class of the device (step 1260*p*). As one example, access to particular entertainment services on the home network (such as games) may only be available to particular classes of devices (such as gaming devices and personal computers). To provide access to a subset of services, the local proxy 1213 may look-up on an access control list a list of services that are associated with the device class indicated by the received device information, as described previously with respect to FIG. 8. The local proxy 1213 then may provide access only to the identified services or devices on the home network, as depicted in the table below and described previously with respect to FIG. 8.

| Service | Device Class | Allowed | Not Allowed |
|---|---|---|---|
| Game Service | Gaming Device | X | |
| Game Service | Personal Computer | X | |
| Game Service | PDA | | X |
| Financial Planning Service | Gaming Device | | X |
| Financial Planning Service | Personal Computer | X | |
| Financial Planning Service | PDA | | X |

The table above illustrates that a gaming device is allowed only to access the game service, a personal computer is allowed to access the game service and the financial planning service, and a PDA is not allowed access to the game service or the financial planning service. Some implementations may use an access control list by a device type (e.g., client device or non-client device), a platform, an operating environment, or another manner used to classify devices.

When permitted by the device class of the device 1210, the local proxy 1213 provides to the device 1210 access to requested devices, services or information (step 1270*p*). The device 1210 receives the provided access (step 1270*d*).

When the device class of the device 1210 is not permitted to have the requested access, the local proxy 1213 may send a message that explains that the device is not permitted to have the requested access (step 1275*p*), which message is received by the device 1210 (step 1275*d*).

Additionally or alternatively, the device class of the device 1210 may be appended to communications sent through the local proxy 1213 to other devices in the home network.

One example of process 1200 in which the device 1210 is a game device, such as game device 112*b* of FIG. 1, is described with reference to FIG. 2. The game device 1210 submits to the local proxy 1213 a request for network access (step 1230*d*), which is received by the local proxy 1213 (step 1230*p*).

The local proxy 1213 selects an IP address for use by the game device 1210 (step 1235*p*). The IP address selected is one of the unassigned IP addresses in address information 250. In this example, the local proxy 1213 selects IP address 282 (specifically, "123.45.45.102") for use by the game device 1210.

The local proxy 1213 associates the selected IP address 282 with the game device 1210 and the device class of the game device 1210 (step 1240*p*). This may be accomplished, for example, when the local proxy 1213 accesses device information, such as device information 113*c* of FIG. 1, for the game device 1210. The accessed device identifier, device type, and device class information for the game device 1210 is stored in address information 250 in association with the IP address 281. Specifically, the information is stored in address information 250 as device identifier, device type, and device class for device 259 (which corresponds to game device 1210). In this manner, the device class and other device information for the game device 1210 is associated with the selected IP address 282.

The IP address 282 is sent to the game device 1210 (step 1245*p*), which receives the IP address 282 (step 1245*d*). At some later time, the game device 1210 sends a request to access a gaming service (step 1250*d*), which is received by the local proxy 1213 (step 1250*p*).

The local proxy 1213 identifies the device class of the game device 1210 as "Game device" by accessing information for device 259 in address information 250. Specifically, the local proxy 1213 looks up the IP address 282 used by the game device 1210 in the address information 250. Thus, the local proxy accesses device information for the game device 1210 through the association of the device information with the IP address 282 in the address information 250.

The local proxy 1213 then determines whether a device having a device class of "game device" is permitted to access the gaming service, as identified in the access request (step 1260*p*). When the game device 1210 is permitted such access, the local proxy 1213 provides access to the gaming service to the game device 1210 (step 1270*p*). The game device 1210 receives the access (step 1270*d*).

In some implementations, additionally or alternatively, the type of device (e.g., whether the device is a client device or a non-client device) may be determined by the local proxy 1213, and the local proxy 1213 may take action based on the type of device. For example, a non-client device may not be permitted to use the local proxy to access a network external to the home network (e.g., the Internet).

Although FIGS. 1-12 illustrate particular functional implementations of system communication techniques to be used to communicate between client systems and host systems, and FIGS. 1-12 illustrate, the benefits of such communication techniques are not limited to systems communicating in a client and host relationship, such as an Internet access or service provider or other online service provider, and are equally applicable to other contexts. For example, the benefits are applicable to any desired system that is accessed by a user system, such as in a point-to-point communications system. The techniques described may be implemented by a local proxy server, such as a home network device (e.g., item 113 described with respect to FIG. 1) or a protocol server module (e.g., item 313 of FIG. 3).

Furthermore, although the characteristics and features of the various components shown by FIGS. 1, 3-6, and 10 may differ dramatically based on advancements in the state-of-the-art, the following describes at least one contemplated implementation for those components. A client device typically includes a general purpose computer that has an internal or an external storage for storing data and programs such as an operating system (OS) (e.g., DOS ("Disk Operating System"), Windows®, Windows® 95, Windows® 98, Windows® 2000, Windows® NT, Windows® Millennium Edition, Windows® XP, OS/2, and Linux) and one or more application programs. Examples of application programs include authoring applications (e.g., word processing programs, database programs, spreadsheet programs, presentation programs, and graphics programs) capable of generating documents or other electronic content; client applications (e.g., AOL client, CompuServe client, AIM client, AOL TV client, and an ISP client capable of communicating with other computer users, accessing various computer resources, and viewing, creating, or otherwise manipulating electronic content); and browser applications (e.g., Netscape's Navigator and Microsoft's Internet Explorer) capable of rendering standard Internet content.

The general-purpose computer also includes a central processing unit ("CPU") for executing instructions in response to commands from a client controller. In one implementation, the client controller may include one or more of the application programs installed on the internal or external storage of the general-purpose computer. In another implementation, the client controller may include application programs externally stored in and executed by one or more device(s) external to the general-purpose computer.

The general-purpose computer may include a communications device for sending and receiving data. One example of the communications device is a modem. Other examples include a transceiver, a set-top box, a communications card, a satellite dish, an antenna, or another network adapter capable of transmitting and receiving data over the communications link through a wired or wireless data pathway.

The general-purpose computer also may include a television ("TV") tuner for receiving TV programming in the form of broadcast, satellite, and/or cable TV signals. As a result, the client device can selectively and/or simultaneously display network content received by communications device and TV programming content received by the TV tuner.

The general-purpose computer may include an input/output interface that enables a wired or wireless connection to various peripheral devices. Examples of peripheral devices include, but are not limited to, a mouse, a mobile phone, a personal digital assistant (PDA), a keyboard, a display monitor with or without a touch screen input, and/or a TV remote control for receiving information from and rendering information to subscribers. Other examples may include voice recognition and synthesis devices.

Devices such as a mobile telephone, a PDA, and a TV remote control may be peripheral with respect to the general-purpose computer. In some implementations, such devices may themselves include the functionality of the general-purpose computer and operate as the client device. For example, the mobile phone or the PDA may include computing and networking capabilities, and may function as a client device by accessing a network and communicating with a host system. Furthermore, the client system may include one, some or all of the components and devices described above.

The network described above also may be referred to as a delivery network.

The techniques and concepts have described inserting control information into a communications request, such as in step 564*p* in FIG. 5, step 864*p* in FIG. 8, step 970 in FIG. 9, and step 1145 in FIG. 11. Inserting control information includes appending or otherwise adding control information to the communications request. The techniques and concepts may also be applied to other techniques, such as transmitting control information with the communication request. For example, control information may be transmitted with the communication request by sending a communication that may be associated with the communication request.

The features are not limited to computer device contexts. The identification of the particular device or identity in communications from a system and tailoring system-provided information or features to the particular device or identity is equally advantageous to other contexts, such as to tailor TV programs provided over a cable or satellite provider or to restrict telephone access (e.g., to restrict access to a particular area code, such as 900, or regions, such as international or long distance calls). Furthermore, the techniques and concepts described also are applicable to communications internal to the home network.

The access control information has been illustrated using a set of parental control levels. The benefits of the techniques described are not limited to a system that use parental control levels and are equally applicable to a system that uses other parental control information, such as a binary parental control process in which parental controls are either applied or not applied to a particular device or identity.

The techniques and concepts have been described using parental control information. These techniques are equally applicable to other types of access controls.

Implementations may include a method or process, an apparatus or system, or computer software on a computer medium. It will be understood that various modifications may be made within the following claims. For example, advantageous results still could be achieved if steps of the disclosed techniques were performed in a different order and/or if components in the disclosed systems were combined in a different manner and/or replaced or supplemented by other components.

What is claimed is:

1. A method for regulating access based on a device class of a user device in a home network, the method comprising:
   receiving, at a proxy in a home network, a message from a device in the home network that includes a request for a network address for use by the device from which the message was sent;
   in response to receiving the message from the device, assigning a network address for the device;
   determining, based on information included in the received message, a device class for the device;
   associating the assigned network address and the device class determined for the device with the device;
   storing the association between the device and the assigned network address and the device class determined for the device;
   receiving, at the proxy in the home network, a request from the device to access a destination system, the request including an indication that the request was sent from the assigned network address;
   in response to receiving the request, accessing the stored association of the assigned network address and the device class determined for the device;
   based on the indication that the request was sent from the assigned network address and the stored association of the assigned network address and the device class determined for the device, identifying the device class of the device; and
   regulating access to the destination system based on the device class identified for the device.

2. The method of claim 1 wherein the proxy comprises a home gateway device.

3. The method of claim 1 wherein the proxy is located on the device.

4. The method of claim 1 wherein the proxy comprises a router.

5. The method of claim 1 wherein the proxy is located between the device and the destination system.

6. The method of claim 1 wherein regulating access to the destination system based on the device class identified for the device comprises applying, based on the device class identified for the device, device control information to communications using the proxy.

7. The method of claim 6 wherein applying device control information comprises using the proxy to append device control information to communications sent through the proxy to the trusted system.

8. The method of claim 1 wherein regulating access to the destination system based on the device class identified for the device comprises:
- determining if devices of the device class identified for the device are permitted to access a service or information provided by the destination system; and
- enabling access to the service or information provided by the destination system based on a determination that devices of the device class identified for the device are permitted to access the service or information provided by the destination system.

9. The method of claim 1 wherein regulating access to the destination system based on the device class identified for the device comprises:
- determining if devices of the device class identified for the device are permitted to access a service or information provided by the destination system; and
- denying access to the service or information provided by the destination system based on a determination that devices of the device class identified for the device are not permitted to access the service or information provided by the destination system.

10. The method of claim 1 wherein the device class comprises a type of operating environment.

11. The method of claim 1 wherein the device class comprises one of a type of hardware platform or a type of software platform.

12. The method of claim 1 wherein the device class comprises a type of device.

13. The method of claim 12 wherein the type of device comprises one of a client device or a non-client device.

14. A computer-readable medium having embodied thereon a computer program configured to regulate access based on a device class of a user device in a home network, the medium comprising one or more code segments configured to:
- receive, at a proxy in a home network, a message from a device in the home network that includes a request for a network address for use by the device from which the message was sent;
- assign a network address for the device in response to receiving the message from the device;
- determine, based on information included in the received message, a device class for the device;
- associate the assigned network address and the device class determined for the device with the device;
- store the association between the device and the assigned network address and the device class determined for the device;
- receive, at the proxy in the home network, a request from the device to access a destination system, the request including an indication that the request was sent from the assigned network address;
- access the stored association of the assigned network address and the device class determined for the device in response to receiving the request;
- identify the device class of the device based on the indication that the request was sent from the assigned network address and the stored association of the assigned network address and the device class determined for the device; and
- regulate access to the destination system based on the device class identified for the device.

15. The medium of claim 14 wherein the proxy is located between the device and the destination system.

16. The medium of claim 14 wherein the one or more code segments configured to regulate access to the destination system based on the device class identified for the device comprise one or more code segments configured to apply, based on the device class identified for the device, device control information to communications using the proxy.

17. A proxy for regulating access based on a device class of a user device in a home network, the proxy comprising a processor connected to a storage device and one or more input/output devices, wherein the processor is configured to:
- receive a message from a device in the home network that includes a request for a network address for use by the device from which the message was sent;
- assign a network address for the device in response to receiving the message from the device;
- determine, based on information included in the received message, a device class for the device;
- associate the assigned network address and the device class determined for the device with the device;
- store the association of the assigned network address and the device class determined for the device;
- receive, at the proxy in the home network, a request from the device to access a destination system, the request including an indication that the request was sent from the assigned network address;
- access the stored association of the assigned network address and the device class determined for the device in response to receiving the request;
- identify the device class of the device based on the indication that the request was sent from the assigned network address and the stored association of the assigned network address and the device class determined for the device; and
- regulate access to the destination system based on the device class identified for the device.

18. The proxy of claim 17 wherein the proxy comprises a home gateway device.

19. The proxy of claim 17 wherein the proxy comprises a router.

20. The proxy of claim 17 wherein the proxy is located between the device and the destination system.

21. The proxy of claim 17 wherein the processor is further configured to regulate access to the destination system based on the device class identified for the device by applying device control information to communications between the device and the destination system.

* * * * *